(12) United States Patent
Zheng et al.

(10) Patent No.: US 12,389,373 B2
(45) Date of Patent: Aug. 12, 2025

(54) TRANSMISSION METHOD AND DEVICE

(71) Applicants: China Mobile Communication Co., Ltd Research Institute, Beijing (CN); China Mobile Communications Group Co., Ltd., Beijing (CN)

(72) Inventors: Yi Zheng, Beijing (CN); Jing Dong, Beijing (CN); Jingwen Zhang, Beijing (CN); Jing Jin, Beijing (CN); Qixing Wang, Beijing (CN); Guangyi Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 798 days.

(21) Appl. No.: 17/641,953

(22) PCT Filed: Sep. 11, 2020

(86) PCT No.: PCT/CN2020/114699
§ 371 (c)(1),
(2) Date: Jun. 27, 2022

(87) PCT Pub. No.: WO2021/047621
PCT Pub. Date: Mar. 18, 2021

(65) Prior Publication Data
US 2022/0338173 A1    Oct. 20, 2022

(30) Foreign Application Priority Data
Sep. 11, 2019    (CN) .......................... 201910856971.9

(51) Int. Cl.
*H04W 72/02*    (2009.01)
*H04W 72/0446*  (2023.01)
*H04W 72/0453*  (2023.01)

(52) U.S. Cl.
CPC ....... *H04W 72/02* (2013.01); *H04W 72/0446* (2013.01); *H04W 72/0453* (2013.01)

(58) Field of Classification Search
CPC ............. H04W 72/02; H04W 72/0446; H04W 72/0453; H04W 72/044; H04B 7/15542; H04L 5/0053
See application file for complete search history.

(56) References Cited

U.S. PATENT DOCUMENTS

2010/0015914 A1* 1/2010 Li .................. H04B 7/2606
                                                   455/7
2012/0269113 A1  10/2012 Park et al.
(Continued)

FOREIGN PATENT DOCUMENTS

CN    108811097 A    11/2018

OTHER PUBLICATIONS

AT&T and Qualcomm, Summary of 7.2.3.3 Mechanisms for resource multiplexing among backhaul and access links, 3GPP TSG RAN WG1 Meeting #96bis, R1-1905739, Apr. 8-12, 2019, Xi'an, China.
(Continued)

*Primary Examiner* — Charles N Appiah
*Assistant Examiner* — Frank E Donado
(74) *Attorney, Agent, or Firm* — Price Heneveld LLP

(57) ABSTRACT

A transmission method and a transmission device are provided. The transmission method for a first node or a third node includes obtaining information of a fifth time-frequency resource, and performing at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting
(Continued)

obtaining information of a fifth time-frequency resource, and performing at least one of the following operations on the fifth time-frequency resource: indicating or configuring whether a second node performs transmission on the fifth time-frequency resource, the second node being a next-level node of the first node; indicating that the fifth time-frequency resource is configured to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource

101 the second node to perform the transmission on the fifth time-frequency resource; not scheduling the second node to perform the transmission on the fifth time-frequency resource; or not configuring the second node to perform the transmission on the fifth time-frequency resource.

17 Claims, 14 Drawing Sheets

(56) References Cited

U.S. PATENT DOCUMENTS

| | | |
|---|---|---|
| 2017/0054540 A1 | 2/2017 | Kim |
| 2019/0007888 A1* | 1/2019 | Li .................. H04W 40/12 |
| 2019/0059039 A1* | 2/2019 | Centonza .............. H04W 76/19 |
| 2020/0067687 A1 | 2/2020 | Qin et al. |
| 2022/0182160 A1* | 6/2022 | Su .................... H04B 17/309 |

OTHER PUBLICATIONS

AT&T, Summary of 7.2.3.1 Enhancements to support NR backhaul links, 3GPP TSG RAN WG1 Meeting #95, R1-1814127, Spokane, USA, Nov. 12-16, 2018.
AT&T, IAB Enhancements for Rel 17, Agenda item: 8.1.10, 3GPP TSG RAN Plenary Meeting #84, RP-192109, Newport Beach, USA, Jun. 3-6, 2019.

* cited by examiner

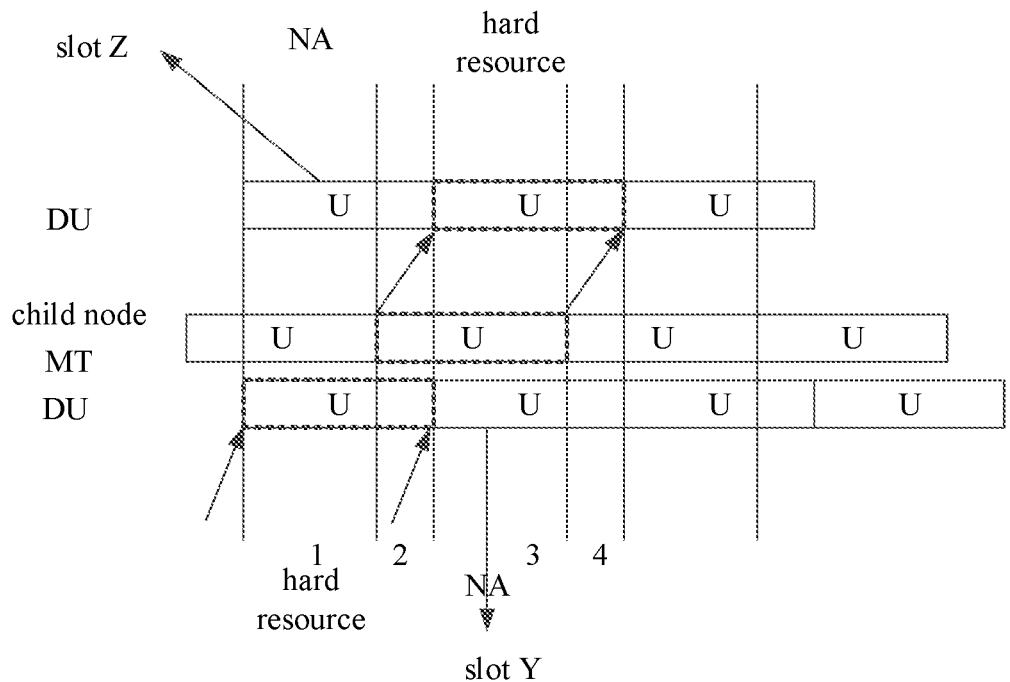

Fig. 11 obtaining information of a fifth time-frequency resource, and performing at least one of the following operations on the fifth time-frequency resource: indicating or configuring whether a second node performs transmission on the fifth time-frequency resource, the second node being a next-level node of the first node; indicating that the fifth time-frequency resource is configured to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource ⟵ 101

Fig. 12 obtaining information of a fifth time-frequency resource, and performing at least one of the following operations on the fifth time-frequency resource: receiving a first message from a first node or a third node, the first message indicating or configuring whether a second node performs transmission on the fifth time-frequency resource, the second node being a next-level node of the first node; receiving a second message from the first node or the third node, the second message indicating that the fifth time-frequency resource is configured to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource

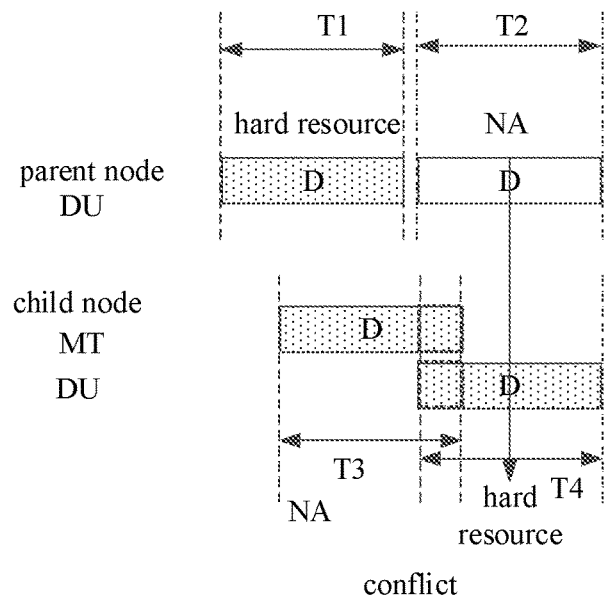

Fig. 14

TRANSMISSION METHOD AND DEVICE

CROSS-REFERENCE TO RELATED APPLICATION

This application is the U.S. national phase of PCT Application No. PCT/CN2020/114699 filed on Sep. 11, 2020, which claims a priority of the Chinese patent application No. 201910856971.9 filed on Sep. 11, 2019, which are incorporated herein by reference in their entireties.

TECHNICAL FIELD

The present disclosure relates to the field of wireless communication technology, in particular to a transmission method and a transmission device.

BACKGROUND

In order to reduce dependence on optical fibers as well as cost, an Integrated Access and Backhaul (IAB) technology has been introduced in the related art. As shown in FIG. 1, there are IAB nodes in an IAB scenario, an access function of the IAB node is called as a Distributed Unit (DU) function, and a backhaul function is called as a Mobile Terminal (MT) function. In the IAB technology, optical-fiber backhaul is replaced with high-frequency air-interface transmission, and data is transmitted to a site having an optical fiber transmission capability via a multi-hop link.

Resource allocation modes in the IAB technology include Frequency Division Multiplexing (FDM), Time Division Multiplexing (TDM) and Space Division Multiplexing (SDM). FIG. 2 shows the TDM transmission, FIG. 3 shows the FDM transmission and FIG. 4 shows the SDM transmission, where gNB represents a base station, DL represents a downlink, UL represents an uplink, BH-DL represents backhaul downlink transmission, and BH-UL represents backhaul uplink transmission.

Currently, the IAB is restrained by a half-duplex operation mode, i.e., when the MT operates, the DU may not operate. Time resources includes a time resource used by the MT and a time resource used by the DU. MT resources are indicated and configured on the basis of the DU of a previous-level node. DU resources a hard resource, a soft resource, an NA resource, an uplink resource, a downlink resource and a flexible resource. Here, the hard resource, the soft resource and the NA resource may be further combined to form a hard uplink resource, a hard downlink resource, a hard flexible resource, etc.

The hard resource represents that the DU may use a corresponding physical resource freely without considering a resource configuration of the MT. The soft resource represents that the DU needs to firstly determine whether a corresponding resource is scheduled by the MT, if not, the DU may use the resource, and otherwise, the DU may not use the resource. The NA resource represents that a corresponding time resource may not be used by the DU. In the related art, in a specific configuration, there is a conflict between the MT resource and the DU resource in the IAB.

SUMMARY

An object of the present disclosure is to provide a transmission method and a transmission device, so as to prevent the occurrence of resource overlapping or a transmitting and receiving conflict for the IAB during the transmission.

In order to solve the above-mentioned technical problem, the present disclosure provides the following technical solutions.

In one aspect, the present disclosure provides in some embodiments a transmission method for a first node or a third node, including obtaining information of a fifth time-frequency resource, and performing at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

In a possible embodiment of the present disclosure, the obtaining the information of the fifth time-frequency resource includes at least one of: receiving the information of the fifth time-frequency resource reported by the second node; receiving high-layer signaling with the information of the fifth time-frequency resource; receiving a Media Access Control (MAC) Control Element (CE) with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the information of the fifth time-frequency resource is obtained in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, the indicating or configuring whether the second node performs transmission on the fifth time-frequency resource includes any of: in downlink transmission, indicating, or configuring, or overriding a state of the fifth time-frequency resource in a fourth resource for the second node to be the third state or the second state, or indicating or configuring that the second node does not perform transmission; and in uplink transmission, indicating, or configuring, or overriding a state of the fifth time-frequency resource in a third resource for the second node to be the third state or the second state, or indicating or configuring that the second node does not perform transmission.

In a possible embodiment of the present disclosure, the indicating that the fifth time-frequency resource is to be used by the second node for transmission includes indicating that the fifth time-frequency resource is to be used by the DU of the second node for transmission or be used by the MT of the second node for transmission.

In a possible embodiment of the present disclosure, the not expecting or not scheduling the second node to perform the transmission on the fifth time-frequency resource includes any of: in downlink transmission, not scheduling and/or not configuring, by the first node, the second node to perform the transmission on the fifth time-frequency resource in a third resource and/or on the fifth time-frequency resource in a first resource; in the downlink transmission, not expecting, by the first node, the second node to perform the transmission on the fifth time-frequency resource in a fourth resource; in uplink transmission, not scheduling and/or not configuring, by the first node, the second node to perform the transmission on the fifth time-frequency resource in the fourth resource and/or on the fifth time-frequency resource in a second resource; and in the uplink transmission, not expecting, by the first node, the second node to perform the transmission in the fifth time-frequency resource in the third resource.

In a possible embodiment of the present disclosure, the time unit includes at least one symbol, or at least one slot or at least one sub-frame.

In another aspect, the present disclosure provides in some embodiments a transmission method for a second node, including obtaining information of a fifth time-frequency resource, and performing at least one of the following operations on the fifth time-frequency resource: receiving a first message from a first node or a third node, the first message indicating or configuring whether a second node performs transmission on the fifth time-frequency resource, the second node being a next-hop node of the first node; receiving a second message from the first node or the third node, the second message indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

In a possible embodiment of the present disclosure, the obtaining the information of the fifth time-frequency resource includes at least one of: receiving high-layer signaling, the high-layer signaling being with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the information of the fifth time-frequency resource is obtained in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, in downlink transmission, the first message indicates, or configures, or overrides a state of the fifth time-frequency resource in a fourth resource for the second node to be the third state or the second state, or indicates, or configures, or overrides that the second node does not perform transmission; and in uplink transmission, the first message indicates, or configures, or overrides a state of the fifth time-frequency resource in a third resource for the second node to be the third state or the second state, or overwrites or indicates or configures that the second node does not perform transmission.

In a possible embodiment of the present disclosure, the second message indicates that the fifth time-frequency resource is to be used by the DU of the second node for transmission or be used by the MT of the second node for transmission.

In a possible embodiment of the present disclosure, the not expecting and/or not scheduling and/or not configuring the second node to perform the transmission on the fifth time-frequency resource includes at least one of: in downlink transmission, not expecting the MT of the second node to perform the transmission on the fifth time-frequency resource in a third resource; in the downlink transmission, not expecting the first node to schedule and/or configure the transmission and/or perform the transmission on the fifth time-frequency resource in a first resource; in the downlink transmission, not expecting and/or not configuring and/or not scheduling the DU of the second node to perform the transmission on the fifth time-frequency resource in a fourth resource; in uplink transmission, not scheduling and/or not configuring the DU of the second node to perform the transmission on the fifth time-frequency resource in the third resource; in the uplink transmission, not expecting the MT of the second node to perform the transmission on the fifth time-frequency resource in the fourth resource; or in the uplink transmission, not expecting the first node to configure and/or schedule the transmission and/or perform the transmission on the fifth time-frequency resource in a second resource.

In a possible embodiment of the present disclosure, the time unit includes at least one symbol, or at least one slot or at least one sub-frame.

In yet another aspect, the present disclosure provides in some embodiments a transmission device for a first node or a third node, including a processing module configured to obtain information of a fifth time-frequency resource, and perform at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

In a possible embodiment of the present disclosure, the processing module is further configured to perform at least one of: receiving the information of the fifth time-frequency resource reported by the second node; receiving high-layer signaling with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processing module is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, the processing module is configured to perform any of: in downlink transmission, indicating, or configuring, or overriding a state of the fifth time-frequency resource in a fourth resource for the second node to be the third state or the second state, or indicating or configuring that the second node does not perform transmission; and in uplink transmission, indicating, or configuring, or overriding a state of the fifth time-frequency resource in a third resource for the second node to be the third state or the second state, or indicating or configuring that the second node does not perform transmission.

In a possible embodiment of the present disclosure, the processing module is configured to indicate that the fifth time-frequency resource is to be used by the DU of the second node for transmission or be used by the MT of the second node for transmission.

In a possible embodiment of the present disclosure, the processing module is configured to perform any of: in downlink transmission, not scheduling and/or not configuring, by the first node, the second node to perform the transmission on the fifth time-frequency resource in a third resource and/or on the fifth time-frequency resource in a first resource; in the downlink transmission, not expecting, by the first node, the second node to perform the transmission on the fifth time-frequency resource in a fourth resource; in uplink transmission, not scheduling and/or not configuring, by the first node, the second node to perform the transmission on the fifth time-frequency resource in the fourth resource and/or on the fifth time-frequency resource in a second resource; and in the uplink transmission, not expecting, by the first node, the second node to perform the transmission in the fifth time-frequency resource in the third resource.

In a possible embodiment of the present disclosure, the time unit includes at least one symbol, or at least one slot or at least one sub-frame.

In still yet another aspect, the present disclosure provides in some embodiments a transmission device for a first node or a third node, including a processor and a transceiver. The processor is configured to obtain information of a fifth time-frequency resource, and performing at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

In a possible embodiment of the present disclosure, the processor is further configured to perform at least one of: receiving the information of the fifth time-frequency resource reported by the second node; receiving high-layer signaling with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processor is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, the processor is configured to perform any of: in downlink transmission, indicating, or configuring, or overriding a state of the fifth time-frequency resource in a fourth resource for the second node to be the third state or the second state, or indicating or configuring that the second node does not perform transmission; and in uplink transmission, indicating, or configuring, or overriding a state of the fifth time-frequency resource in a third resource for the second node to be the third state or the second state, or indicating or configuring that the second node does not perform transmission.

In a possible embodiment of the present disclosure, the processor is configured to indicate that the fifth time-frequency resource is to be used by the DU of the second node for transmission or be used by the MT of the second node for transmission.

In a possible embodiment of the present disclosure, the processor is configured to perform any of: in downlink transmission, not scheduling and/or not configuring, by the first node, the second node to perform the transmission on the fifth time-frequency resource in a third resource and/or on the fifth time-frequency resource in a first resource; in the downlink transmission, not expecting, by the first node, the second node to perform the transmission on the fifth time-frequency resource in a fourth resource; in uplink transmission, not scheduling and/or not configuring, by the first node, the second node to perform the transmission on the fifth time-frequency resource in the fourth resource and/or on the fifth time-frequency resource in a second resource; and in the uplink transmission, not expecting, by the first node, the second node to perform the transmission in the fifth time-frequency resource in the third resource.

In a possible embodiment of the present disclosure, the time unit includes at least one symbol, or at least one slot or at least one sub-frame.

In still yet another aspect, the present disclosure provides in some embodiments a transmission device for a second node, including a processing module configured to obtain information of a fifth time-frequency resource, and perform at least one of the following operations on the fifth time-frequency resource: receiving a first message from a first node or a third node, the first message indicating or configuring whether the second node performs transmission on the fifth time-frequency resource, the first node being a preceding-hop node of the second node; receiving a second message from the first node or the third node, the second message indicating that the fifth time-frequency resource is to be used by the first node or the second node for transmission; or not expecting and/or not scheduling and/or not configuring the second node to perform the transmission on the fifth time-frequency resource.

In a possible embodiment of the present disclosure, the processing module is configured to perform at least one of: receiving high-layer signaling, the high-layer signaling being with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processing module is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, in downlink transmission, the first message indicates, or configures, or overrides a state of the fifth time-frequency resource in a fourth resource for the second node to be the third state or the second state, or indicates, or configures, or overrides that the second node does not perform transmission; and in uplink transmission, the first message indicates, or configures, or overrides a state of the fifth time-frequency resource in a third resource for the second node to be the third state or the second state, or overwrites or indicates or configures that the second node does not perform transmission.

In a possible embodiment of the present disclosure, the second message indicates that the fifth time-frequency resource is to be used by the DU of the second node for transmission or be used by the MT of the second node for transmission.

In a possible embodiment of the present disclosure, the processing module is configured to perform at least one of: in downlink transmission, not expecting the MT of the second node to perform the transmission on the fifth time-frequency resource in a third resource; in the downlink transmission, not expecting the first node to schedule and/or configure the transmission and/or perform the transmission on the fifth time-frequency resource in a first resource; in the downlink transmission, not expecting and/or not configuring and/or not scheduling the DU of the second node to perform the transmission on the fifth time-frequency resource in a fourth resource; in uplink transmission, not scheduling and/or not configuring the DU of the second node to perform the transmission on the fifth time-frequency resource in the third resource; in the uplink transmission, not expecting the MT of the second node to perform the transmission on the fifth time-frequency resource in the fourth resource; or in the uplink transmission, not expecting the first node to configure and/or schedule the transmission and/or perform the transmission on the fifth time-frequency resource in a second resource.

In a possible embodiment of the present disclosure, the time unit includes at least one symbol, or at least one slot or at least one sub-frame.

In still yet another aspect, the present disclosure provides in some embodiments a transmission device for a second node, including a processor and a transceiver. The processor is configured to obtain information of a fifth time-frequency resource, and perform at least one of the following operations on the fifth time-frequency resource: receiving a first message from a first node or a third node, the first message indicating or configuring whether the second node performs transmission on the fifth time-frequency resource, the second node being a next-hop node of the first node; receiving a second message from the first node or the third node, the second message indicating that the fifth time-frequency resource is to be used by the first node or the second node for transmission; not expecting and/or not scheduling and/or not configuring the second node to perform the transmission on the fifth time-frequency resource.

In a possible embodiment of the present disclosure, the processor is configured to perform at least one of: receiving high-layer signaling, the high-layer signaling being with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processor is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, in downlink transmission, the first message indicates, or configures, or overrides a state of the fifth time-frequency resource in a fourth resource for the second node to be the third state or the second state, or indicates, or configures, or overrides that the second node does not perform transmission; and in uplink transmission, the first message indicates, or configures, or overrides a state of the fifth time-frequency resource in a third resource for the second node to be the third state or the second state, or indicate or configures or overrides that the second node does not perform transmission.

In a possible embodiment of the present disclosure, the second message indicates that the fifth time-frequency resource is to be used by the DU of the second node for transmission or be used by the MT of the second node for transmission.

In a possible embodiment of the present disclosure, the processor is configured to perform at least one of: in downlink transmission, not expecting the MT of the second node to perform the transmission on the fifth time-frequency resource in a third resource; in the downlink transmission, not expecting the first node to schedule and/or configure the transmission and/or perform the transmission on the fifth time-frequency resource in a first resource; in the downlink transmission, not expecting and/or not configuring and/or not scheduling the DU of the second node to perform the transmission on the fifth time-frequency resource in a fourth resource; in uplink transmission, not scheduling and/or not configuring the DU of the second node to perform the transmission on the fifth time-frequency resource in the third resource; in the uplink transmission, not expecting the MT of the second node to perform the transmission on the fifth time-frequency resource in the fourth resource; or in the uplink transmission, not expecting the first node to configure and/or schedule the transmission and/or perform the transmission on the fifth time-frequency resource in a second resource.

In a possible embodiment of the present disclosure, the time unit includes at least one symbol, or at least one slot or at least one sub-frame.

In still yet another aspect, the present disclosure provides in some embodiments a communication device, including a memory, a processor, and a computer program stored in the memory and capable of being executed by the processor. The computer program is configured to be executed by the processor to implement the steps of the above-mentioned transmission methods.

In still yet another aspect, the present disclosure provides in some embodiments a computer-readable storage medium storing therein a computer program. The computer program is configured to be executed by a processor to implement the steps of the above-mentioned transmission methods.

The present disclosure has the following beneficial effect.

According to the embodiments of the present disclosure, through configuring the time-frequency resources, it is able to prevent the occurrence of resource overlapping or a transmitting and receiving conflict during the transmission.

BRIEF DESCRIPTION OF THE DRAWINGS

FIG. 11 is a schematic view showing IAB uplink transmission;
FIG. 12 is a schematic view showing a transmission method for a first node or a third node according to an embodiment of the present disclosure;
FIG. 13 is a schematic view showing a transmission method for a second node according to an embodiment of the present disclosure;
FIGS. 14 to 21 are schematic views showing resource states according to an embodiment of the present disclosure;

DETAILED DESCRIPTION

In order to make the technical problems to be solved, the technical solutions and the advantages of the present disclosure clearer, the present disclosure will be described hereinafter in details in conjunction with the drawings and embodiments.

Figure 1:
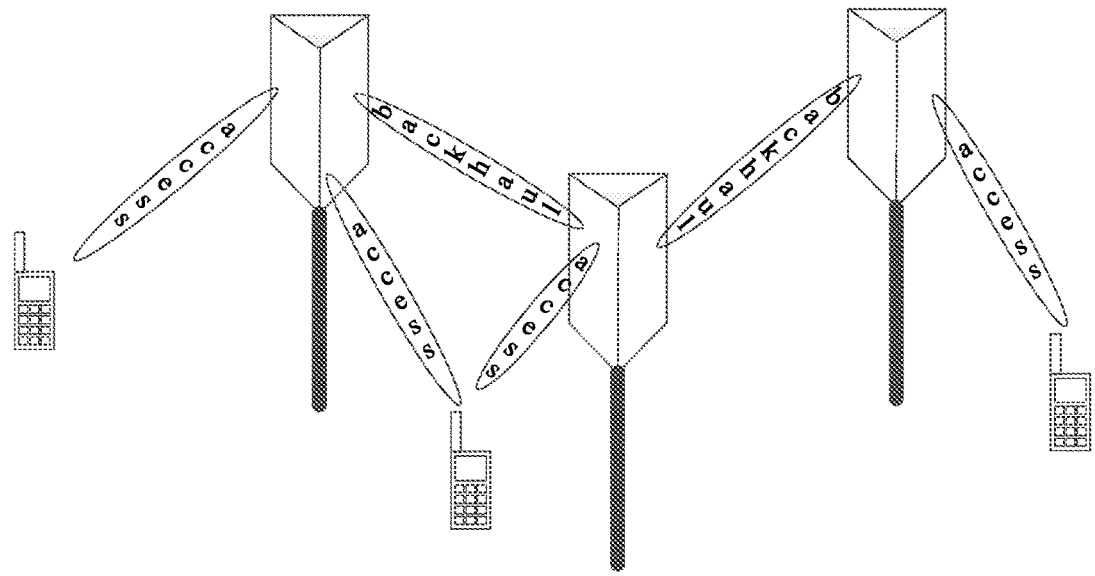
FIG. 1 is a schematic view showing an IAB scenario.
Figure 2:
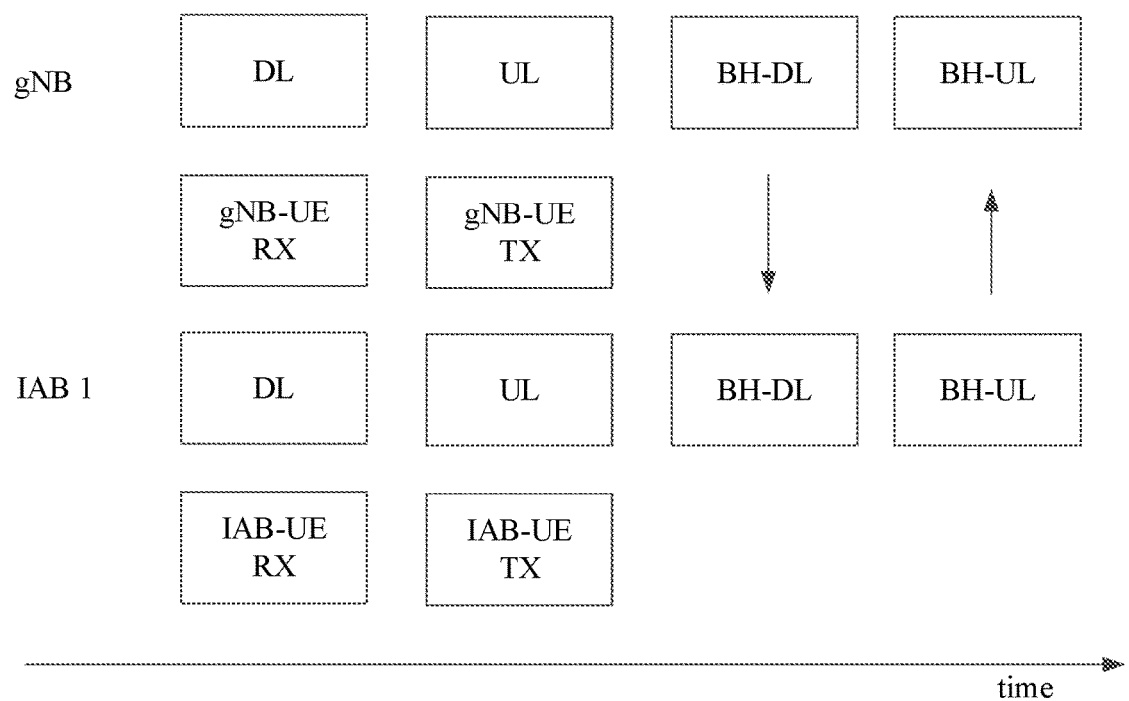
FIG. 2 is a schematic view showing TDM transmission.
Figure 3:
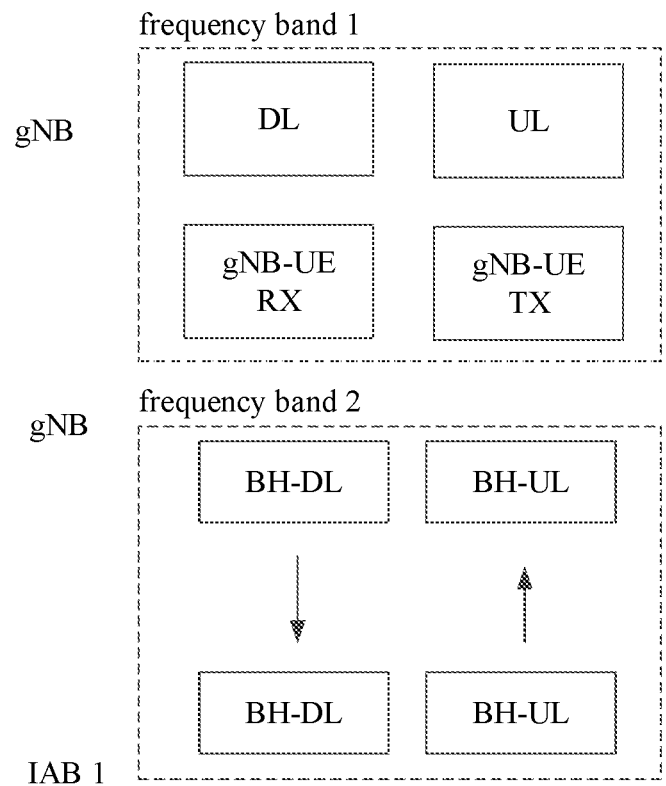
FIG. 3 is a schematic view showing FDM transmission.
Figure 4:
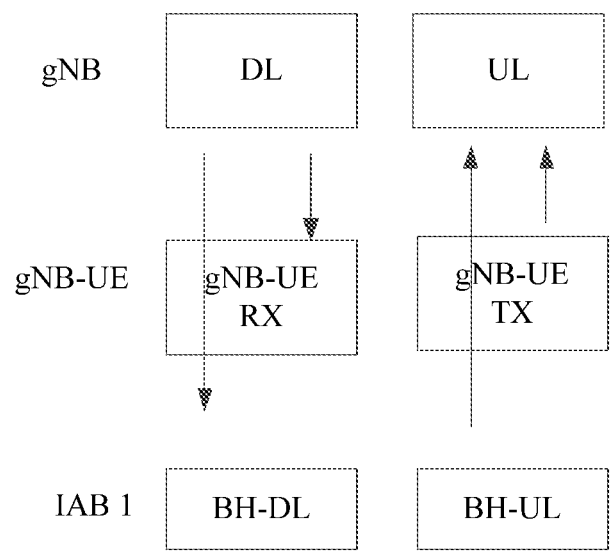
FIG. 4 is a schematic view showing SDM transmission.
Figure 5:
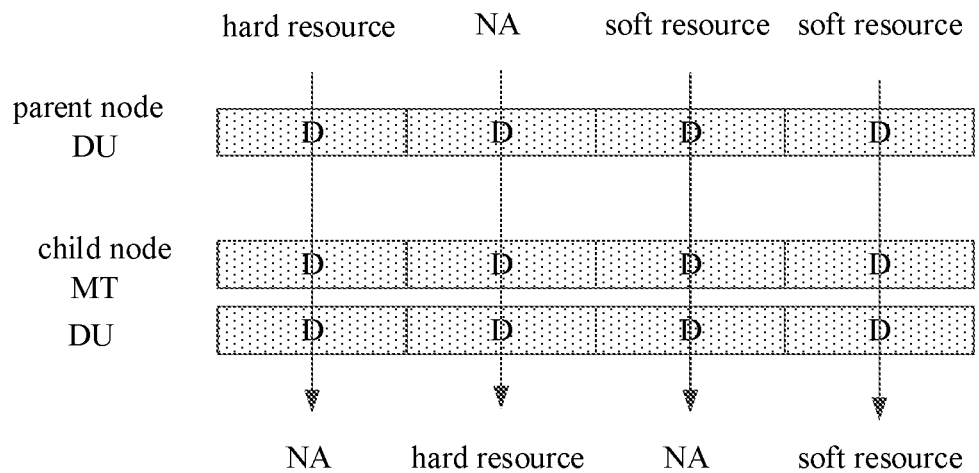
FIG. 5 is a schematic view showing attributes of a preceding-hop resource and a next-hop resource.

In an IAB, an attribute of a resource is transmitted by a Control Unit (CU) to each IAB node. During the configuration of the CU, in order to prevent the occurrence of a conflict between multi-hop links, the CU may coordinate the attributes (hard, soft, NA) of a preceding-hop resource and a next-hop resource as possible. As shown in FIG. 5, when a first downlink resource for a DU of a parent node is configured as hard, a resource for a DU of a corresponding child node needs to be configured as NA, so as to ensure that an MT of the child node may be scheduled by the DU of the parent node at any time. Identically, when a resource configured for the parent node is NA, an MT resource for the corresponding child node is not scheduled, so a hard resource is configured for the DU of the child node, i.e., the resource may be used by the DU freely. When a resource configured for the DU of the parent node is soft, the corresponding resource may be used or may not be used. In order to prevent the resource from being used and schedule the MT of the child node, a resource corresponding to the DU of the child node should be configured as NA, and the corresponding resource is reserved for the MT. In order to improve the resource utilization, the resource may also be configured as soft, so as to determine whether the resource is used by the DU in accordance with whether the MT of the child node is scheduled.

Figure 6:
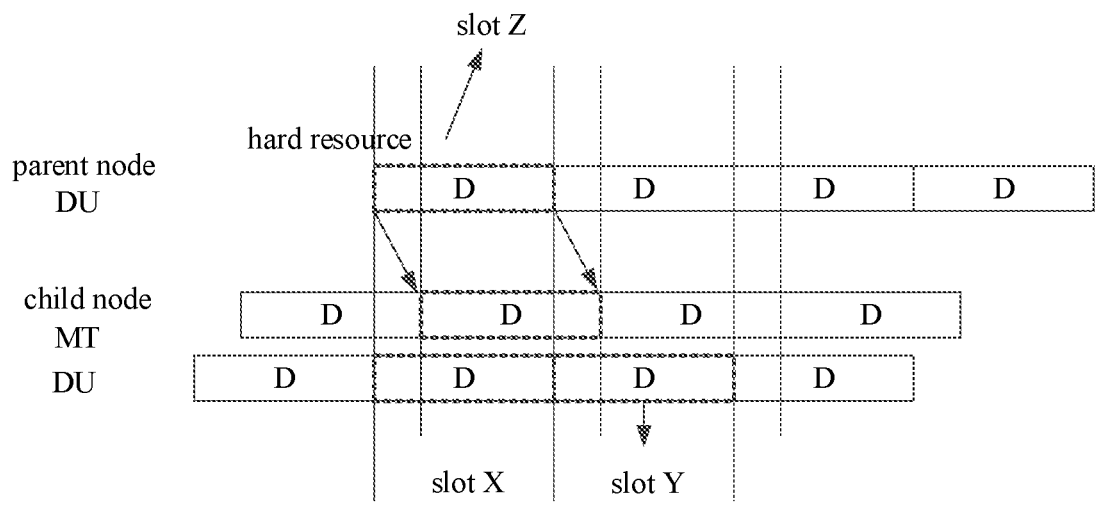
FIG. 6 is a schematic view showing a situation where a timing at an MT side of the IAB is not aligned with a timing at a DU side of the IAB.

However, due to a propagation delay in downlink transmission, it is difficult for an operation timing at an MT side of the child node or IAB to be aligned with a timing at a DU side of the child node or IAB, as shown in FIG. 6. In the case of downlink, due to the transmission delay, downlink data from the parent node within a slot Z is received by the MT of the child node after one propagation delay. At a next time point, when the DU of the child node needs to perform transmission within a slot Y, the slots for the MT and the DU may overlap each other, so the transmitting and receiving may be performed simultaneously, which is contradict to the related art where the IAB needs to meet a half-duplex requirement.

When the resource for the DU of the child node is configured as hard within the slot Y, it is impossible for the DU to take an avoidance measure for not performing the transmission in advance because the DU does not know a configuration of the parent node.

Figure 7:
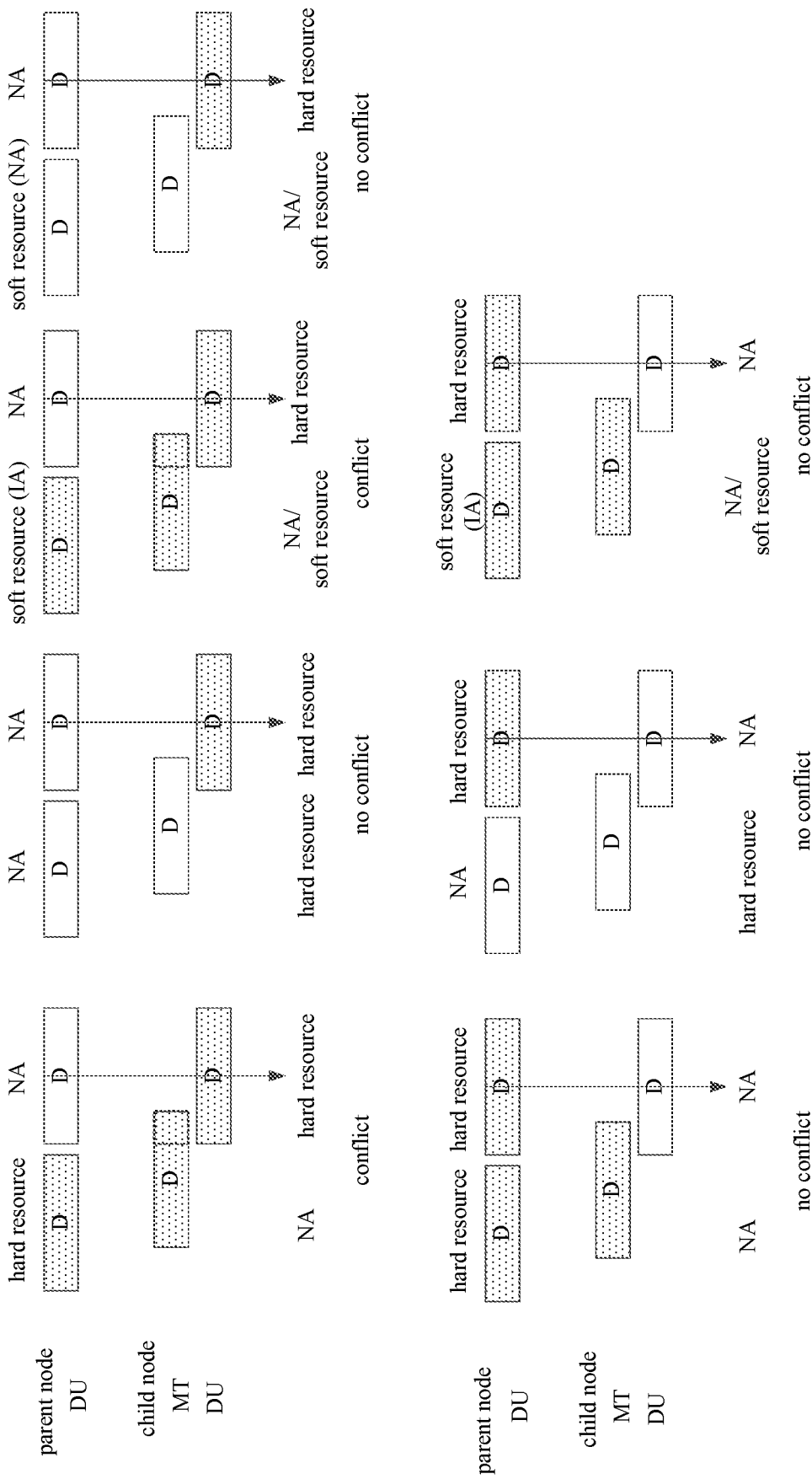
FIG. 7 is a schematic view showing situations where a conflict occur and does not occur for the MT and DU during the transmission.

In some cases, due to the configuration of the resources, the conflict between the transmitting and the receiving for the MT and the DU of the IAB may occur definitely, and in some other cases, the conflict may not occur. As shown in FIG. 7, (1) for a first section in a first row, when a resource within a second slot of downlink slots for the parent node is configured as NA, a resource for the DU of the corresponding child node is configured as hard resource. When a resource within a preceding slot for the parent node is configured as hard resource, the MT of the corresponding child node shall perform reception, and at this time, the conflict may occur. (2) For a second section in the first row, when a resource within a preceding slot for the parent node is configured as NA, there is no service transmission for the MT of the corresponding child node, so no conflict may occur. (3) For a third section in the first row, when a resource within a preceding slot for the parent node is configured as soft and indicated as available, the conflict may occur between the MT of the corresponding child node and the DU within the second slot. (4) For a fourth section in the first row, when a resource within a preceding slot for the parent node is configured as soft-NA, the MT of the corresponding child node does not perform any transmission, so there is no conflict. (5) For a first section in a second row, when a resource within a second slot for the parent node is configured as hard, a resource for the DU of the corresponding child node is configured as NA. At this time, there is no conflict for the IAB of the child node even when a resource within a preceding slot for the parent node is in any state.

Figure 8:
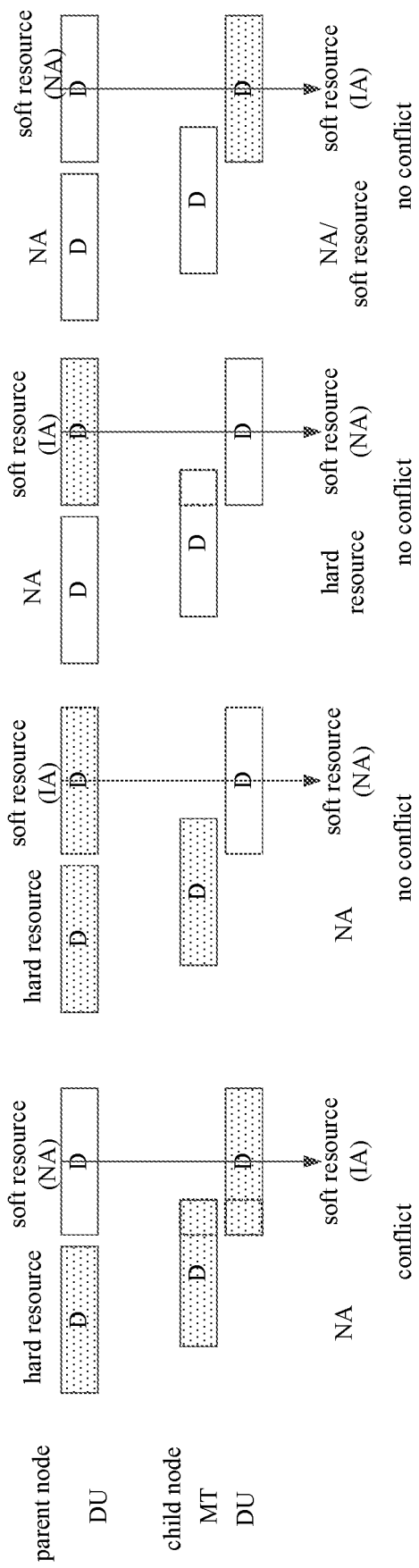
FIG. 8 is a schematic view showing a situation where a second slot is in a soft state.

As shown in FIG. 8, when a resource within a second slot for the parent node is soft, the soft resource is indicated as NA and a resource within a preceding slot for the parent node is hard, there is a conflict between the MT and the DU of the child node. In the other cases, there is no conflict.

Figure 9:
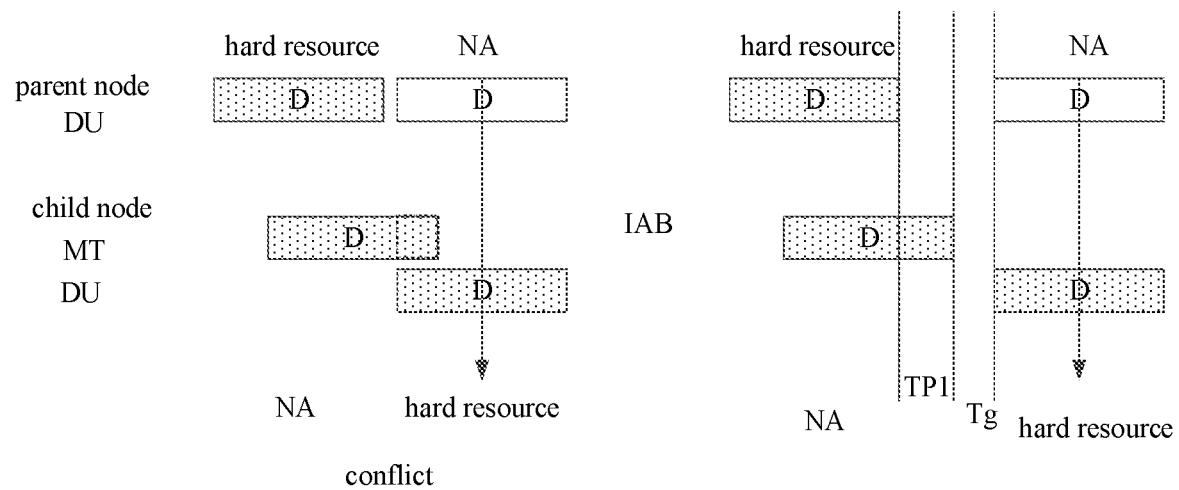
FIG. 9 is a schematic view showing a time to be reserved for preventing the occurrence of conflicts.

In order to prevent the occurrence of the conflict, theoretically for the DU of the child node, it is necessary to reserve a certain time within a next slot for the transmission within a preceding slot and uplink/downlink time switching. As shown in FIG. 9, the time mainly includes a time for the downlink transmission for the DU of the parent node, and a time for switching the reception within a preceding slot to the downlink transmitting within a next slot for the child IAB. The switching time is a time between the transmitting and receiving for the child node IAB. The to-be-reserved time Delta is a sum of TP1 and Tg.

Figure 10:
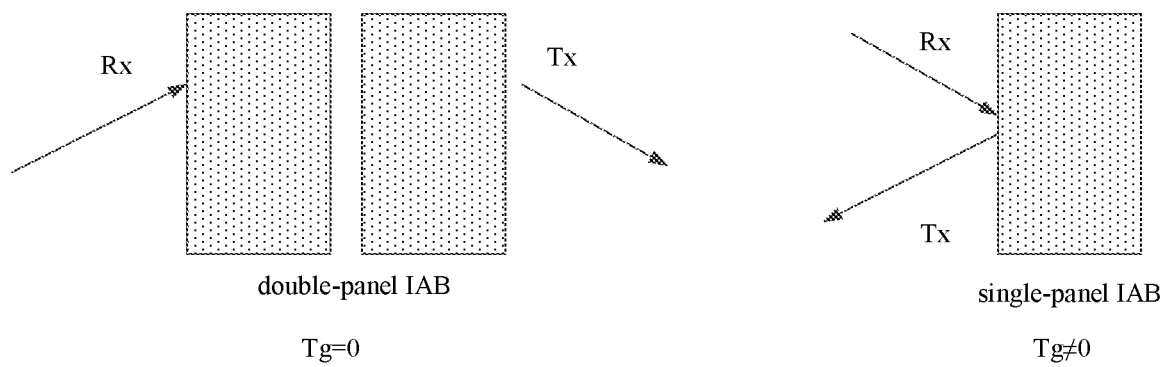
FIG. 10 is a schematic view showing a double-panel IAB and a single-panel IAB.

However, for different devices and different IAB forms, the transmitting and receiving switching times are different. For example, as shown in FIG. 10, in the case of a double-panel IAB, there is no switching time because no element needs to be shared for the transmitting and receiving between two panels. In the case that data is sent to and received from a same panel, the switching time needs to be taken into consideration. Depending on different selected elements, the switching times are different with respect to different frequency bands. For example, for FR1, the switching time is 10 μs to 72 μs, and for FR2, the switching time is 3 μs to 18 μs.

A value of delta needs to be known by the DU of the parent node or the child node, so as to avoid the conflict through scheduling or any other method. TP1 is known by the parent node. However, Tg is a parameter of the child node, and the parent node does not necessarily know whether the child node has a single-panel or a multi-panel architecture as well as a specific value of Tg.

As shown in FIG. 11, there also exists a same problem for an uplink transmission slot. In the case of uplink transmission, when a resource within a slot Z for the DU of the parent node is NA, a resource for the DU of the child node is configured as hard. When a resource within a slot Z+1 for the DU of the parent node is hard, the MT of the child node may perform the uplink transmission within a corresponding slot. At this time, the DU of the IAB child node has probably performed the uplink transmission within the slot Z. Hence, in part 2, the resource for the MT of the child node may overlap the resource for the DU of the child node, with the overlapped part of delta=TP1+Tg. For the slot Z, the scheduling by the DU of the child node is not limited by the DU of the parent node, so the DU of the child node may perform the transmission on the hard resource. In addition, the DU of the child node does not know definitions on the hard, soft and NA resources for the parent node, so it is difficult to avoid the conflict through scheduling.

An object of the present disclosure is to provide a transmission method and a transmission device, so as to prevent the occurrence of resource overlapping or a transmitting and receiving conflict for the IAB during the transmission.

The present disclosure provides in some embodiments a transmission method for a first node or a third node which, as shown in FIG. 12, includes Step 101 of obtaining information of a fifth time-frequency resource, and performing at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

According to the embodiments of the present disclosure, through configuring the time-frequency resource, it is able to prevent the occurrence of resource overlapping or a transmitting and receiving conflict during the transmission.

The performing the transmission includes transmission of data, transmission of a reference signal, and transmission of control information, the scheduling the transmission includes scheduling data transmission, and the configuring the transmission includes non-data transmission. The transmission is performed at a DU side or an MT side. It is appreciated that the transmission may include transmitting and/or receiving.

The first node and the third node are IAB nodes, relays or base stations, or terminals having a relay or backhaul function or a function of transferring data to the other terminal. The IAB node is a relay node, a base station, or a User Equipment (UE) having a backhaul or relay function.

The first node is a parent node in an IAB network, and the third node is a CU or a donor. The information of the fifth time-frequency resource includes information of a position of each time-frequency resource, the quantity of time-frequency resources and a size of each time-frequency resource.

In a possible embodiment of the present disclosure, the obtaining the information of the fifth time-frequency resource includes at least one of: receiving the information of the fifth time-frequency resource reported by the second node; receiving high-layer signaling with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter, including configuring parameters in accordance with a network management system.

In a possible embodiment of the present disclosure, the fifth time-frequency resource includes any of at least one slot, at least one symbol, an absolute time, and a specific time length in units of Ts. The absolute time may be in the units of millisecond (ms).

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the information of the fifth time-frequency resource is obtained in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In the embodiments of the present disclosure, the first state is a hard state, and the DU performs the transmission, including transmitting and receiving, on the corresponding resource. The second state is a soft state, and the DU determines whether to perform the transmission on the corresponding resource in accordance with whether the resource is used by the MT. When the MT is not scheduled or does not send or receive a signal, the resource may be used by the DU. When the MT has received an indication "available", the corresponding resource may be used by the DU. The third state is an NA state, where the DU may not use the corresponding resource.

In a specific instance, as shown in FIGS. 7 and 8, a preceding slot for the parent DU is configured to be in a hard state and a next slot is configured to be in an NA state; or a preceding slot for the child DU is configured to be in the NA state and a next slot for the child DU is configured to be in the hard state; or a first slot for the parent DU is configured to be in the hard state and a second slot for the child DU is configured to be in the hard state.

The first to fourth resources include time units and time-domain resources.

In a specific embodiment of the present disclosure, any of operations A to J is performed in at least one of the following cases: in the downlink transmission, the first resource for the first node is configured to be in the first state or to be used for transmission, the second resource for the first node is configured to be in the third state or not to be used for transmission, and the second resource is located after the first resource; in the downlink transmission, the third resource for the second node is configured to be in the third state or not to be used for transmission, the fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in the uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

The operations include: an operation A of indicating or configuring, by the first node, whether the second node performs the transmission on the fifth time-frequency resource, the second node being a next node of the first node, an operation B of indicating, by the first node, that the fifth time-frequency resource is to be used by the first node or the second node for transmission, an operation C of not expecting, by the first node, the second node to perform the transmission on the fifth time-frequency resource, an operation D of not scheduling, by the first node, the second node to perform the transmission on the fifth time-frequency resource, an operation E of not configuring, by the first node, the second node to perform the transmission on the fifth time-frequency resource, an operation F of indicating or configuring, by the first node, whether the second node performs the transmission on the fifth time-frequency resource, the second node being a next node of the first node, an operation G of indicating, by the first node, that the fifth time-frequency resource is to be used by the first node or the second node for transmission, an operation H of not expecting, by the first node, the second node to perform the transmission on the fifth time-frequency resource, an operation I of not scheduling, by the first node, the second node to perform the transmission on the fifth time-frequency resource, and an operation J of not configuring, by the first node, the second node to perform the transmission on the fifth time-frequency resource.

In a specific instance, the first node (parent IAB) receives the information of the fifth time-frequency resource reported by the second node (child IAB), or obtains the information of the fifth time-frequency resource in accordance with conflict resource information configured by a system. The first node (parent IAB) configures the child IAB (the second node) not to perform the transmission on the fifth time-frequency resource in accordance with the obtained information of the fifth time-frequency resource (e.g., not to schedule a data service or not configure the transmission of a downlink Channel State Indication-Reference Signal (CSI-RS). Alternatively, the parent IAB does not expect the child IAB to perform the transmission on the fifth time-frequency resource within a front part of the second slot.

In another specific instance, the information of the fifth time-frequency resource is reported to the third node (the CU or a donor base station) The donor base station or the CU configures the parent IAB to use the corresponding fifth time-frequency resource for transmission, or indicates the child IAB to use the corresponding fifth time-frequency resource for transmitting data or other signals.

In a possible embodiment of the present disclosure, the indicating or configuring whether the second node performs transmission on the fifth time-frequency resource includes any of: in downlink transmission, indicating, or configuring, or overriding a state of the fifth time-frequency resource in a fourth resource for the second node to be the third state or the second state, or indicating or configuring that the second node does not perform transmission; and in uplink transmission, indicating, or configuring, or overriding a state of the fifth time-frequency resource in a third resource for the second node to be the third state or the second state, or indicating or configuring that the second node does not perform transmission.

The overriding refers to overriding, covering or updating a resource state configured by an original network.

In a possible embodiment of the present disclosure, the indicating that the fifth time-frequency resource is to be used by the second node for transmission includes indicating that the fifth time-frequency resource is to be used by the DU of the second node for transmission or be used by the MT of the second node for transmission.

In a possible embodiment of the present disclosure, the not expecting or not scheduling the second node to perform the transmission on the fifth time-frequency resource includes any of: in downlink transmission, not scheduling and/or not configuring, by the first node, the second node to perform the transmission on the fifth time-frequency resource in a third resource and/or on the fifth time-frequency resource in a first resource; in the downlink transmission, not expecting, by the first node, the second node to perform the transmission on the fifth time-frequency resource in a fourth resource; in uplink transmission, not scheduling and/or not configuring, by the first node, the second node to perform the transmission on the fifth time-frequency resource in the fourth resource and/or on the fifth time-frequency resource in a second resource; and in the uplink transmission, not expecting, by the first node, the second node to perform the transmission in the fifth time-frequency resource in the third resource.

In a possible embodiment of the present disclosure, the time unit includes at least one symbol, or at least one slot or at least one sub-frame.

The present disclosure further provides in some embodiments a transmission method for a second node which, as shown in FIG. 13, includes Step 201 of obtaining information of a fifth time-frequency resource, and performing at least one of the following operations on the fifth time-frequency resource: receiving a first message from a first node or a third node, the first message indicating or configuring whether a second node performs transmission on the fifth time-frequency resource, the second node being a next-hop node of the first node; receiving a second message from the first node or the third node, the second message indicating that the fifth time-frequency resource is to be used by the first node or the second node for transmission; or not expecting and/or not scheduling and/or not configuring the second node to perform the transmission on the fifth time-frequency resource.

According to the embodiments of the present disclosure, through configuring the time-frequency resource, it is able to prevent the occurrence of resource overlapping or a transmitting and receiving conflict during the transmission.

The performing the transmission includes transmission of data, transmission of a reference signal, and transmission of control information, the scheduling the transmission includes scheduling data transmission, and the configuring the transmission includes configuring non-data transmission. The transmission is performed at a DU side or an MT side.

The first node and the third node are IAB nodes, relays or base stations, or terminals having a relay or backhaul function or a function of transferring data to the other terminal.

The first node is a parent node in an IAB network, and the third node is a CU or a donor. The second node is a child node in the IAB network. The information of the fifth time-frequency resource includes information of a position of each time-frequency resource, the quantity of time-frequency resources and a size of each time-frequency resource.

The IAB node is a relay node, a base station, or a UE having a backhaul or relay function. In a possible embodiment of the present disclosure, the obtaining the information of the fifth time-frequency resource includes at least one of: receiving high-layer signaling, the high-layer signaling being with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter, including configuring parameters in accordance with a network management system.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the information of the fifth time-frequency resource is obtained in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, in downlink transmission, the first message indicates, or configures, or overrides a state of the fifth time-frequency resource in a fourth resource for the second node to be the third state or the second state, or indicates, or configures, or overrides that the second node does not perform transmission; and in uplink transmission, the first message indicates, or configures, or overrides a state of the fifth time-frequency resource in a third resource for the second node to be the third state or the second state, or overwrites or indicates or configures that the second node does not perform transmission.

The first to fourth resources include time units and time-domain resources.

The overriding refers to overriding, covering or updating a resource state configured by an original network.

In a possible embodiment of the present disclosure, the second message indicates that the fifth time-frequency resource is to be used by the DU of the second node for transmission or be used by the MT of the second node for transmission.

In a possible embodiment of the present disclosure, the not expecting and/or not scheduling and/or not configuring to perform the transmission on the fifth time-frequency resource includes at least one of: in downlink transmission, not expecting the MT of the second node to perform the transmission on the fifth time-frequency resource in a third resource; in the downlink transmission, not expecting the first node to schedule and/or configure the transmission and/or perform the transmission on the fifth time-frequency resource in a first resource; in the downlink transmission, not expecting and/or not configuring and/or not scheduling the DU of the second node to perform the transmission on the fifth time-frequency resource in a fourth resource; in uplink transmission, not scheduling and/or not configuring the DU of the second node to perform the transmission on the fifth time-frequency resource in the third resource; in the uplink transmission, not expecting the MT of the second node to perform the transmission on the fifth time-frequency resource in the fourth resource; or in the uplink transmission, not expecting the first node to configure and/or schedule the transmission and/or perform the transmission on the fifth time-frequency resource in a second resource.

In a possible embodiment of the present disclosure, the time unit includes at least one symbol, or at least one slot or at least one sub-frame.

In the embodiments of the present disclosure, the first state is a hard state, and the DU performs the transmission, including transmitting and receiving, on the corresponding resource. The second state is a soft state, and the DU determines whether to perform the transmission on the corresponding resource in accordance with whether the resource is used by the MT. When the MT is not scheduled or does not send or receive a signal, the resource may be used by the DU. When the MT has received an indication "available", the corresponding resource may be used by the DU. The third state is an NA state, and the DU may not use the corresponding resource.

As shown in FIGS. 14 to 21, T1 represents a first time unit or a first time-frequency resource, T2 represents a second time unit or a second time-frequency resource, T3 represents a third time unit or a third time-frequency resource, T4 represents a fourth time unit or a fourth time-frequency resource, the first node is a parent node, and the second node is a child node.

In a specific embodiment of the present disclosure, as shown in FIG. 14, in the downlink transmission, the child node does not expect the MT to perform the transmission on previous X time-frequency resources or time resources of the hard resource (indicated by a dotted box in FIG. 14), and/or on subsequent X time-frequency resources (indicated by a dotted box in FIG. 14).

Alternatively, the parent node does not schedule the MT to perform the transmission on the subsequent X time-frequency resources.

Alternatively, the parent node does not expect the child DU to perform the transmission on the previous X time-frequency resources.

Figure 15:
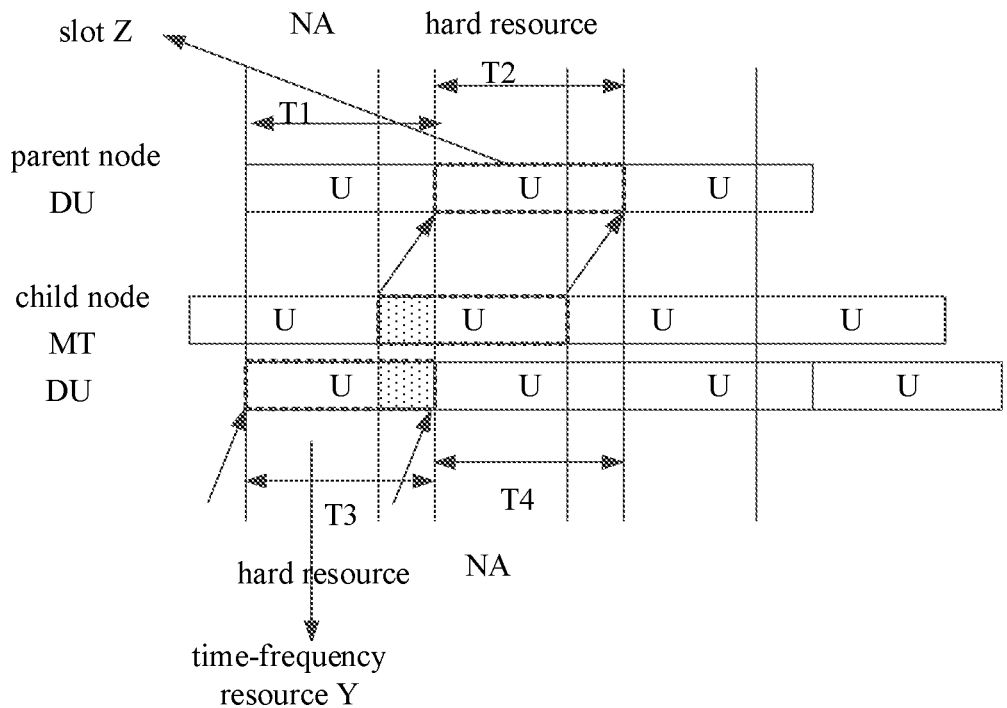

In another specific embodiment of the present disclosure, as shown in FIG. 15, in the uplink transmission, the child node does not expect the MT to perform the transmission (sending) on the previous X time-frequency resources (indicated by a part filed with dots for the MT in FIG. 15).

Alternatively, the parent node does not schedule the transmission on the previous X time-frequency resources of the hard resource or within the slot Z.

Alternatively, the parent node does not expect the child node to perform the transmission on a corresponding time-frequency resource X.

Alternatively, the childe node or DU does not perform the transmission (receiving) on the subsequent X time-frequency resources (indicated by a part filed with dots for the DU in FIG. 15).

Figure 16:
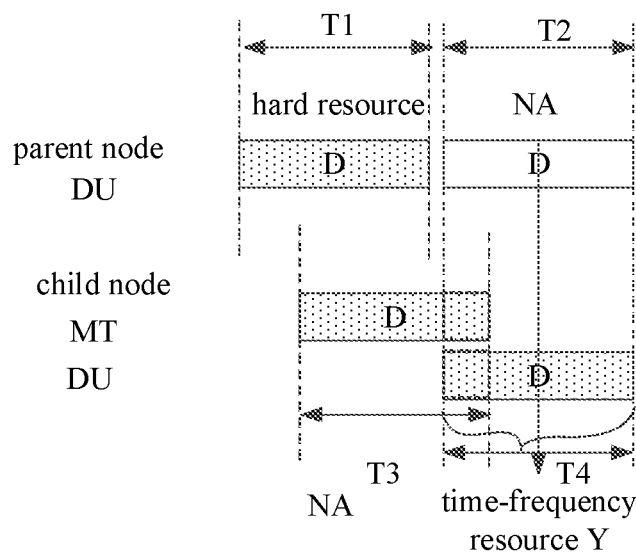

In yet another specific embodiment of the present disclosure, as shown in FIG. 16, in the downlink transmission, a time-frequency resource Y is configured by the CU, the other network node or a protocol to be in the hard state, and the parent node configures and/or updates and/or overrides the previous X time-frequency resources (indicated by a dotted box in FIG. 16) for the child DU as the NA state or soft state.

Figure 17:
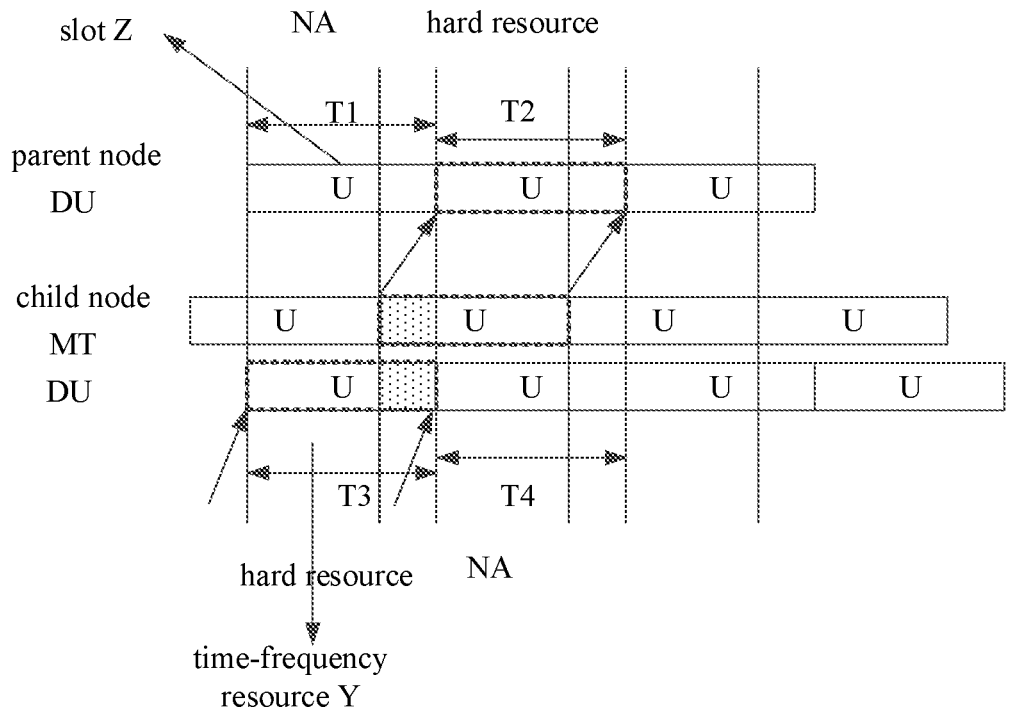

In still yet another specific embodiment of the present disclosure, as shown in FIG. 17, in the uplink transmission, the time-frequency resource Y is configured by the CU, the other network node or the protocol to be in the hard state, and the parent node configures and/or updates and/or overrides the subsequent X time-frequency resources (indicated by a part filled with dots in FIG. 17) for the child DU as the NA state or soft state.

Figure 18:
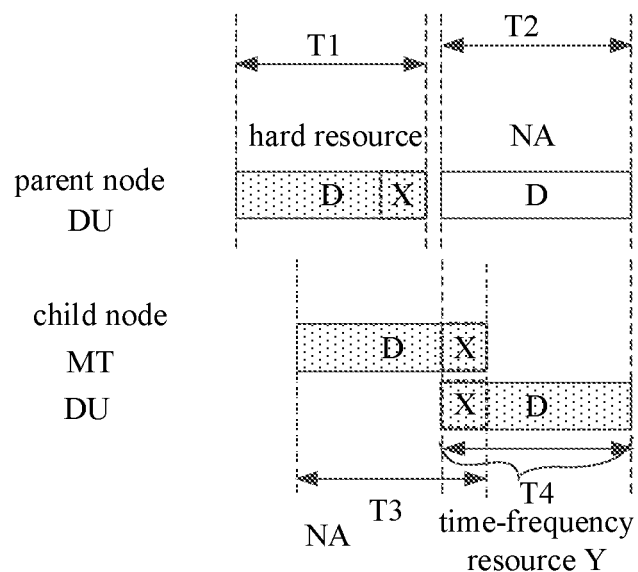

In still yet another specific embodiment of the present disclosure, as shown in FIG. 18, in the downlink transmission, the parent node or the other node indicates that the time-frequency resource X is used by the parent DU, the child MT or the child DU.

Figure 19:
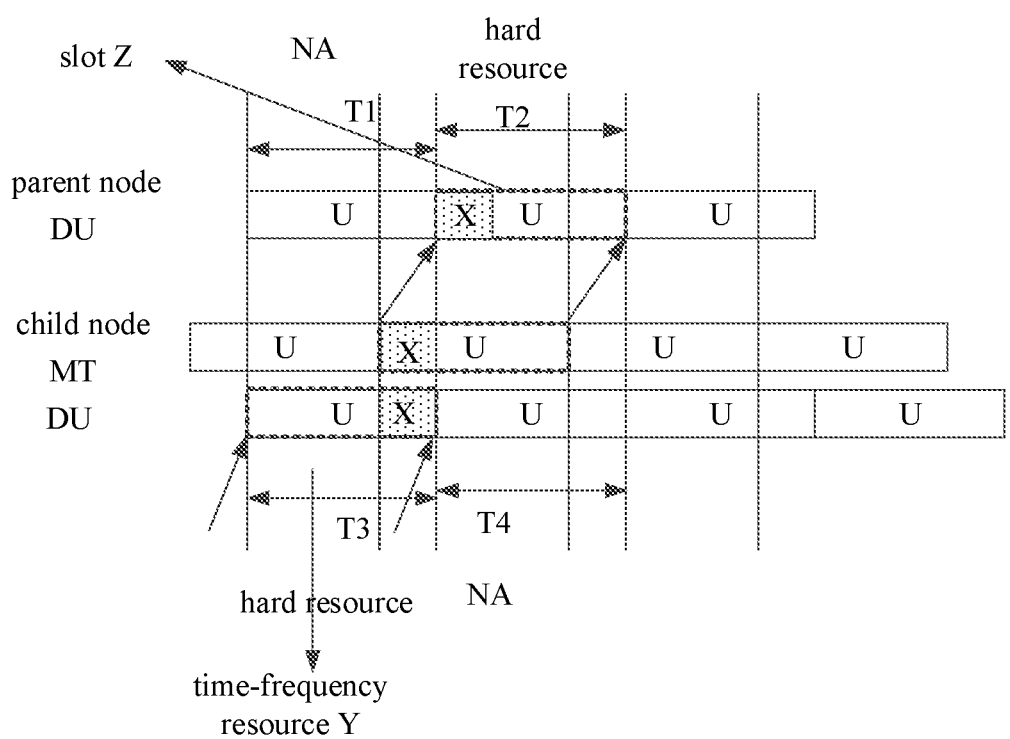

In still yet another specific embodiment of the present disclosure, as shown in FIG. 19, in the uplink transmission, the parent node or the other node indicates that the time-frequency resource X is used by the parent DU, the child MT or the child DU.

In a specific instance, the CU configures a hard resource for a parent node slot 1, and configures an NA resource for slot 2. Correspondingly, in order to prevent the occurrence of the conflict between the resource for the child DU and a configuration of the parent node, a resource corresponding to the slot 1 is NA and a resource corresponding to the slot 2 is hard. The resource for the slot of the parent DU is hard, so the transmission may be performed freely. The child MT needs to receive data within the slot 1, and due to the propagation delay and the switching delay, there may exist a conflict between the child DU and the child MT within the slot 2.

When two panels are used by the child IAB, a receiving operation and a transmitting operation are performed by the child MT on the two panels respectively. At this time, the overlapping resource X may include 0 symbol. Hence, the child IAB does not need to report the overlapping resource, and each of the parent DU and the child DU does not need to limit the scheduling.

When a same panel/radio-frequency is used by the MT and DU of the child IAB, due to the switching delay and the propagation delay, there are X overlapping or conflicting time-frequency resources between the MT and the DU. The parent DU may calculate information of a length or a time of the X time-frequency resources in accordance with the propagation delay and the switching delay. Alternatively, the child node may report information of X or Y (Y is greater than X) time-frequency resources to the parent node. The information of X or Y may also be configured by the CU or a high-layer node to the parent node.

The parent node does not perform scheduling on the corresponding X time-frequency resources, or merely schedules 14-X symbols, or merely considers that the transmission is performed on the 14-X symbols.

The child DU performs the transmission on the hard resource within the corresponding slot 2.

In another specific instance, when the hard resource is located before the NA resource, the parent node indicates that the child DU is incapable of performing the transmission on the corresponding X resources. Alternatively, the child DU determines that the previous X resources of the hard resource are unavailable in accordance with high-layer signaling or configuration information of the other network entity, e.g., the CU.

In yet another specific instance, when the hard resource is located before the NA resource, the parent node, the CU or the other network entity indicates that the X resources are capable of being used by the parent DU, the child MT or the child DU.

Figure 20:
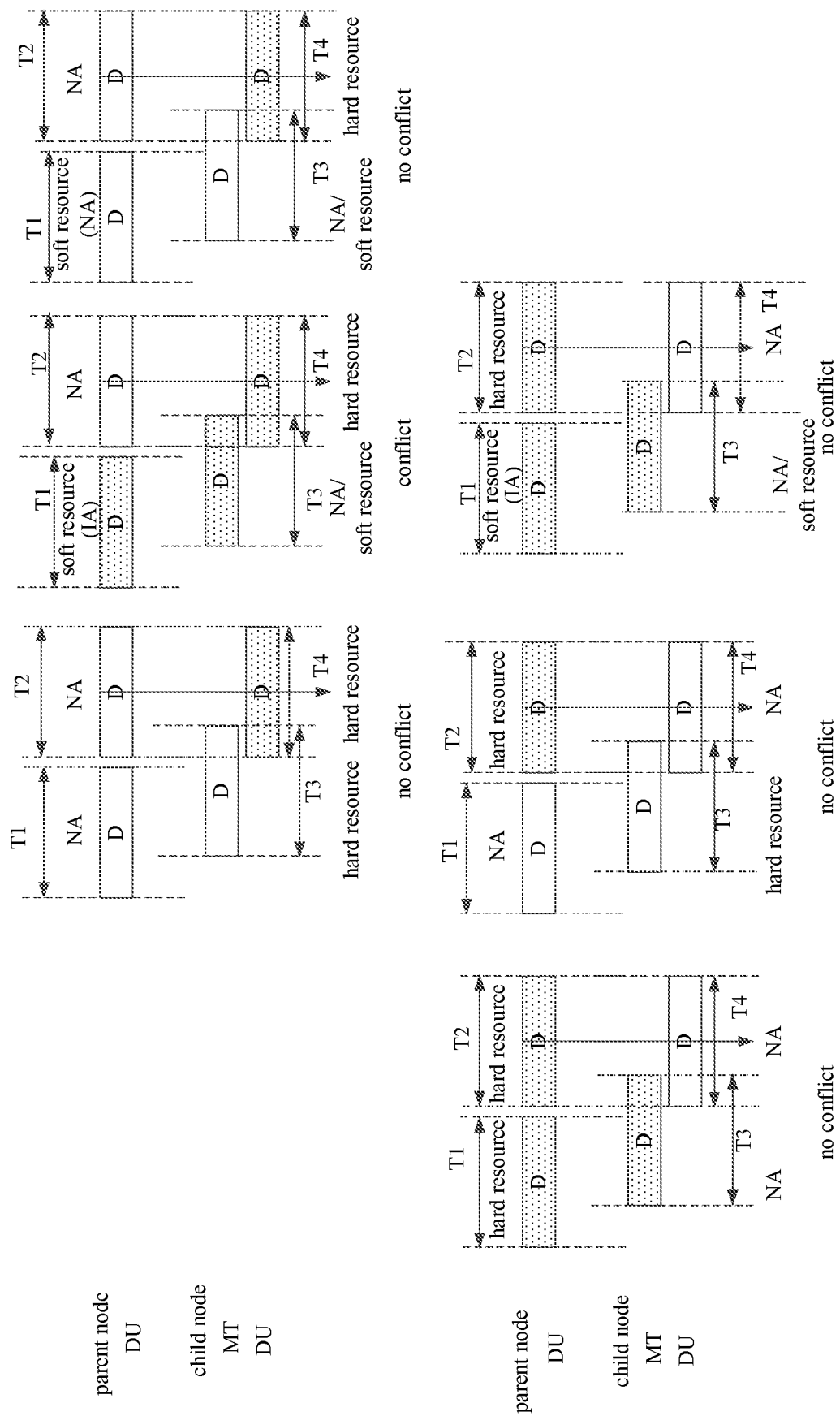
Figure 21:
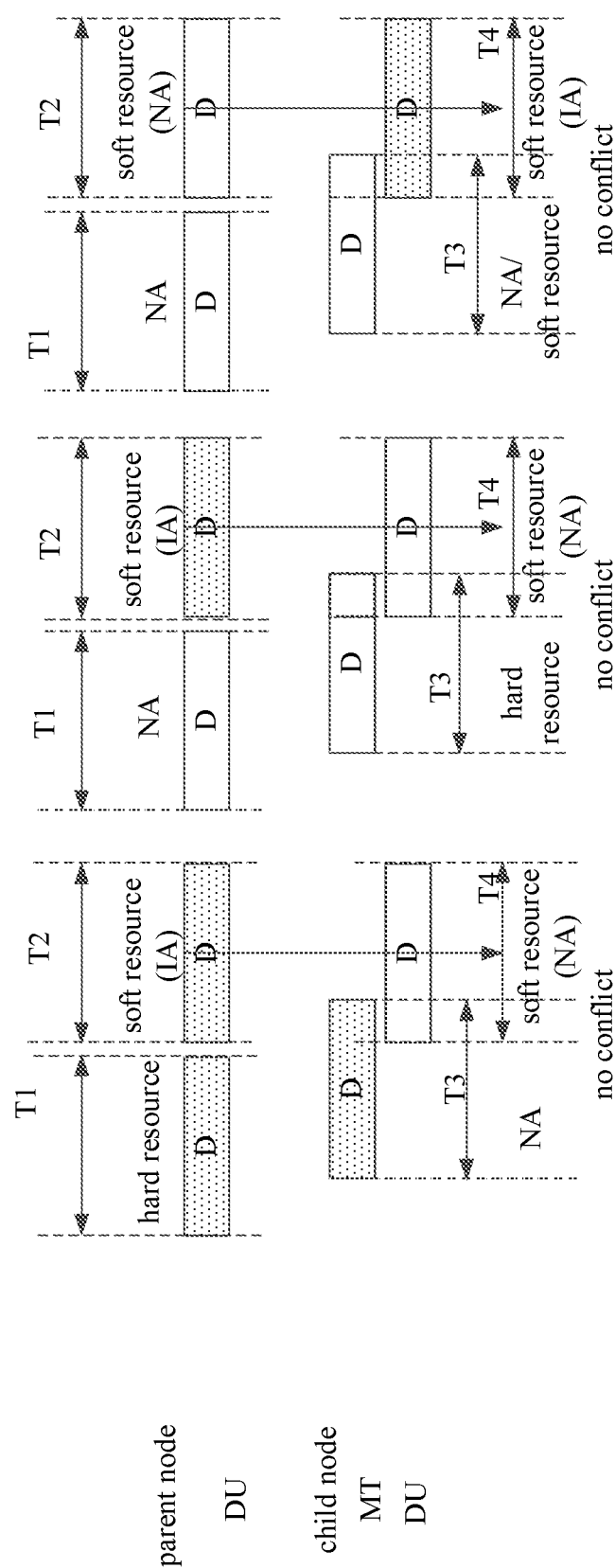

In addition, the resources are configured as shown in FIGS. 20 and 21, the child IAB does not need to report a length of the X resources, or the length of the X resources configured by the system, and at this time, no conflict resource may occur.

In a specific configuration, the resource conflict may occur between the MT and the DU of the IAB. According to the embodiments of the present disclosure, through specifying that a scheduling operation is not performed, or a resource state is not updated, on the corresponding time-frequency resource, or through indicating the use of the resource, it is able to prevent the occurrence of resource overlapping or transmitting and receiving conflict for the IAB during the transmission.

Figure 22:
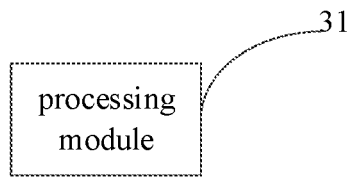
FIG. 22 is a schematic view showing a transmission device for a first node or a third node according to an embodiment of the present disclosure.

The present disclosure further provides in some embodiments a transmission device for a first node or a third node which, as shown in FIG. 22, includes a processing module 31 configured to obtain information of a fifth time-frequency resource, and perform at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

In a possible embodiment of the present disclosure, the processing module 31 is further configured to perform at least one of: receiving the information of the fifth time-frequency resource reported by the second node; receiving high-layer signaling with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processing module 31 is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, the processing module 31 is configured to perform any of: in downlink transmission, indicating, or configuring, or overriding a state of the fifth time-frequency resource in a fourth resource for the second node to be the third state or the second state, or indicating or configuring that the second node does not perform transmission; and in uplink transmission, indicating, or configuring, or overriding a state of the fifth time-frequency resource in a third resource for the second node to be the third state or the second state, or indicating or configuring that the second node does not perform transmission.

In a possible embodiment of the present disclosure, the processing module 31 is configured to indicate that the fifth time-frequency resource is to be used by the DU of the second node for transmission or be used by the MT of the second node for transmission.

In a possible embodiment of the present disclosure, the processing module is configured to perform any of: in downlink transmission, not scheduling and/or not configuring, by the first node, the second node to perform the transmission on the fifth time-frequency resource in a third resource and/or on the fifth time-frequency resource in a first resource; in the downlink transmission, not expecting, by the first node, the second node to perform the transmission on the fifth time-frequency resource in a fourth resource; in uplink transmission, not scheduling and/or not configuring, by the first node, the second node to perform the transmission on the fifth time-frequency resource in the fourth resource and/or on the fifth time-frequency resource in a second resource; and in the uplink transmission, not expecting, by the first node, the second node to perform the transmission in the fifth time-frequency resource in the third resource.

In a possible embodiment of the present disclosure, the time unit includes at least one symbol, or at least one slot or at least one sub-frame.

Figure 23:
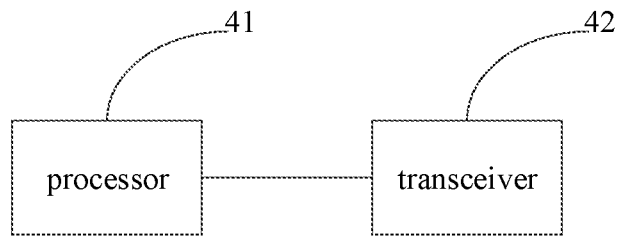
FIG. 23 is a schematic view showing components of the transmission device for the first node or the third node according to an embodiment of the present disclosure.

The present disclosure further provides in some embodiments a transmission device for a first node or a third node which, as shown in FIG. 23, includes a processor 41 and a transceiver 42. The processor 41 is configured to obtain information of a fifth time-frequency resource, and performing at least one of the following operations on the fifth time-frequency resource: indicating or configuring whether a second node performs transmission on the fifth time-frequency resource, the second node being a next-hop node of the first node; indicating that the fifth time-frequency resource is to be used by the first node or the second node for transmission; not expecting the second node to perform the transmission on the fifth time-frequency resource; not scheduling the second node to perform the transmission on the fifth time-frequency resource; or not configuring the second node to perform the transmission on the fifth time-frequency resource.

In a possible embodiment of the present disclosure, the processor 41 is further configured to perform at least one of: receiving the information of the fifth time-frequency resource reported by the second node; receiving high-layer signaling with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processor 41 is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, the processor 41 is configured to perform any of: in downlink transmission, indicating, or configuring, or overriding a state of the fifth time-frequency resource in a fourth resource for the second node to be the third state or the second state, or indicating or configuring that the second node does not perform transmission; and in uplink transmission, indicating, or configuring, or overriding a state of the fifth time-frequency resource in a third resource for the second node to be the third state or the second state, or indicating or configuring that the second node does not perform transmission.

In a possible embodiment of the present disclosure, the processor 41 is configured to indicate that the fifth time-frequency resource is to be used by the DU of the second node for transmission or be used by the MT of the second node for transmission.

In a possible embodiment of the present disclosure, the processor is configured to perform any of: in downlink transmission, not scheduling and/or not configuring, by the first node, the second node to perform the transmission on the fifth time-frequency resource in a third resource and/or on the fifth time-frequency resource in a first resource; in the downlink transmission, not expecting, by the first node, the second node to perform the transmission on the fifth time-frequency resource in a fourth resource; in uplink transmission, not scheduling and/or not configuring, by the first node, the second node to perform the transmission on the fifth time-frequency resource in the fourth resource and/or on the fifth time-frequency resource in a second resource; and in the uplink transmission, not expecting, by the first node, the second node to perform the transmission in the fifth time-frequency resource in the third resource.

In a possible embodiment of the present disclosure, the time unit includes at least one symbol, or at least one slot or at least one sub-frame.

Figure 24:
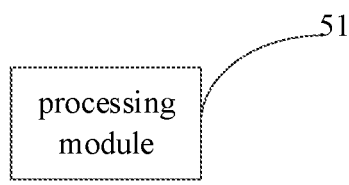
FIG. 24 is a schematic view showing a transmission device for a second node according to an embodiment of the present disclosure.

The present disclosure further provides in some embodiments a transmission device for a second node which, as shown in FIG. 24, includes a processing module 51 configured to obtain information of a fifth time-frequency resource, and perform at least one of the following operations on the fifth time-frequency resource: receiving a first message from a first node or a third node, the first message indicating or configuring whether the second node performs transmission on the fifth time-frequency resource, the first node being a preceding-hop node of the second node; receiving a second message from the first node or the third node, the second message indicating that the fifth time-frequency resource is to be used by the first node or the second node for transmission; or not expecting and/or not scheduling and/or not configuring the second node to perform the transmission on the fifth time-frequency resource.

In a possible embodiment of the present disclosure, the processing module 51 is configured to perform at least one of: receiving high-layer signaling, the high-layer signaling being with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processing module 51 is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, in downlink transmission, the first message indicates, or configures, or overrides a state of the fifth time-frequency resource in a fourth resource for the second node to be the third state or the second state, or indicates, or configures, or overrides that the second node does not perform transmission; and in uplink transmission, the first message indicates, or configures, or overrides a state of the fifth time-frequency resource in a third resource for the second node to be the third state or the second state, or overwrites or indicates or configures that the second node does not perform transmission.

In a possible embodiment of the present disclosure, the second message indicates that the fifth time-frequency resource is to be used by the DU of the second node for transmission or be used by the MT of the second node for transmission.

In a possible embodiment of the present disclosure, the processing module 51 is configured to perform at least one of: in downlink transmission, not expecting the MT of the second node to perform the transmission on the fifth time-frequency resource in a third resource; in the downlink transmission, not expecting the first node to schedule and/or configure the transmission and/or perform the transmission on the fifth time-frequency resource in a first resource; in the downlink transmission, not expecting and/or not configuring and/or not scheduling the DU of the second node to perform the transmission on the fifth time-frequency resource in a fourth resource; in uplink transmission, not scheduling and/or not configuring the DU of the second node to perform the transmission on the fifth time-frequency resource in the third resource; in the uplink transmission, not expecting the MT of the second node to perform the transmission on the fifth time-frequency resource in the fourth resource; or in the uplink transmission, not expecting the first node to configure and/or schedule the transmission and/or perform the transmission on the fifth time-frequency resource in a second resource.

In a possible embodiment of the present disclosure, the time unit includes at least one symbol, or at least one slot or at least one sub-frame.

Figure 25:
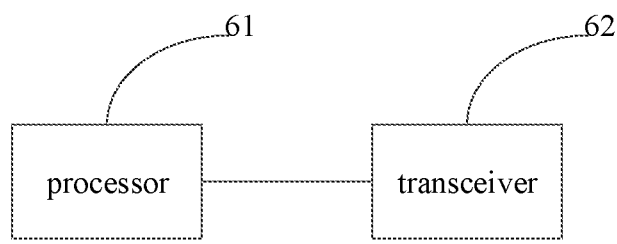
FIG. 25 is a schematic view showing components of the transmission device for the second node according to an embodiment of the present disclosure.

The present disclosure further provides in some embodiments a transmission device for a second node which, as shown in FIG. 25, includes a processor 61 and a transceiver 62. The processor 61 is configured to obtain information of a fifth time-frequency resource, and perform at least one of the following operations on the fifth time-frequency resource: receiving a first message from a first node or a third node, the first message indicating or configuring whether the second node performs transmission on the fifth time-frequency resource, the second node being a next-hop node of the first node; receiving a second message from the first node or the third node, the second message indicating that the fifth time-frequency resource is to be used by the first node or the second node for transmission; not expecting and/or not scheduling and/or not configuring the second node to perform the transmission on the fifth time-frequency resource.

In a possible embodiment of the present disclosure, the processor 61 is configured to perform at least one of: receiving high-layer signaling, the high-layer signaling being with the information of the fifth time-frequency resource; receiving an MAC CE with the information of the fifth time-frequency resource; calculating the information of the fifth time-frequency resource in accordance with at least one of a propagation delay, time for a switching delay or time for a processing delay; or configuring the information of the fifth time-frequency resource in accordance with a network parameter.

In a possible embodiment of the present disclosure, the fifth time-frequency resource includes any of at least one slot, at least one symbol, an absolute time, and a specific time length in units of Ts.

In a possible embodiment of the present disclosure, time units or time-frequency resources for the first node and the second node are configured to be in any of a first state, a second state and a third state. In the first state, a DU of the node is capable of performing the transmission; in the third state, the DU of the node is incapable of performing the transmission; and in the second state, the DU of the node is capable of performing the transmission when an MT of the node does not perform the transmission.

In a possible embodiment of the present disclosure, a part of the time units or time-frequency resources for the first node and a part of the time units or time-frequency resources for the second node are configured to be in two of the three states, and the remaining time units or time-frequency resources are configured to be in the remaining one of the three states.

In a possible embodiment of the present disclosure, the time units or time-frequency resources in the first state represent that the time units or time-frequency resources in the second state are indicated to be capable of being used for DU transmission. The time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

In a possible embodiment of the present disclosure, the processor is configured to obtain the information of the fifth time-frequency resource in at least one of the following cases: in downlink transmission, a first resource for the first node is configured to be in the first state or to be used for transmission, a second resource for the first node is configured to be in the third state or not to be used for transmission, and the second resource is located after the first resource; in the downlink transmission, a third resource for the second node is configured to be in the third state or not to be used for transmission, a fourth resource for the second node is configured to be in the first state or to be used for transmission, and the fourth resource is located after the third resource; in the downlink transmission, the first resource for the first node is configured to be in the first state or to be used for transmission, the fourth resource for the second node is configured to be in the first state or to be used for transmission, and the fourth resource is located after the first resource; in uplink transmission, the third resource for the second node is configured to be in the first state or to be used for transmission, the fourth resource for the second node is configured to be in the third state or not to be used for transmission, and the fourth resource is located after the third resource; in the uplink transmission, the first resource for the first node is configured to be in the third state or not to be used for transmission, the second resource for the first node is configured to be in the first state or to be used for transmission, and the second resource is located after the first resource; or in the uplink transmission, the third resource for the second node is configured to be in the first state or to be used for transmission, the second resource for the first node is configured to be in the first state or to be used for transmission, and the second resource is located after the third resource.

In a possible embodiment of the present disclosure, in downlink transmission, the first message indicates, or configures, or overrides a state of the fifth time-frequency resource in a fourth resource for the second node to be the third state or the second state, or indicates, or configures, or overrides that the second node does not perform transmission; and in uplink transmission, the first message indicates, or configures, or overrides a state of the fifth time-frequency resource in a third resource for the second node to be the third state or the second state, or overwrites or indicates or configures that the second node does not perform transmission.

In a possible embodiment of the present disclosure, the second message indicates that the fifth time-frequency resource is to be used by the DU of the second node for transmission or be used by the MT of the second node for transmission.

In a possible embodiment of the present disclosure, the processor 61 is configured to perform at least one of: in downlink transmission, not expecting the MT of the second node to perform the transmission on the fifth time-frequency resource in a third resource; in the downlink transmission, not expecting the first node to schedule and/or configure the transmission and/or perform the transmission on the fifth time-frequency resource in a first resource; in the downlink transmission, not expecting and/or not configuring and/or not scheduling the DU of the second node to perform the transmission on the fifth time-frequency resource in a fourth resource; in uplink transmission, not scheduling and/or not configuring the DU of the second node to perform the transmission on the fifth time-frequency resource in the third resource; in the uplink transmission, not expecting the MT of the second node to perform the transmission on the fifth time-frequency resource in the fourth resource; or in the uplink transmission, not expecting the first node to configure and/or schedule the transmission and/or perform the transmission on the fifth time-frequency resource in a second resource.

In a possible embodiment of the present disclosure, the time unit includes at least one symbol, or at least one slot or at least one sub-frame.

The present disclosure further provides in some embodiments a communication device, which includes a memory, a processor, and a computer program stored in the memory and capable of being executed by the processor. The computer program is configured to be executed by the processor to implement the steps of the above-mentioned transmission methods.

The present disclosure further provides in some embodiments a computer-readable storage medium storing therein a computer program. The computer program is configured to be executed by a processor to implement the steps of the above-mentioned transmission methods.

It should be appreciated that, the embodiments of the present disclosure are implemented by hardware, software, firmware, middleware, microcode or a combination thereof. For the hardware implementation, the processor includes one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and capable of being executed by the processor. The memory is implemented inside or outside the processor.

The above embodiments have been described in a progressive manner, and the same or similar contents in the embodiments will not be repeated, i.e., each embodiment merely focuses on the difference from the others.

It should be appreciated that, the present disclosure may be provided as a method, a device or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, user terminal device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

It should be further appreciated that, such words as "first" and "second" are merely used to separate one entity or operation from another entity or operation, but are not necessarily used to represent or imply any relation or order between the entities or operations. In addition, such terms as "comprising" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above are optional embodiments of the present disclosure. It should be noted that, a person skilled in the art may make further modifications and improvements without departing from the spirit of the present disclosure, and these modifications and improvements shall also fall within the scope of the present disclosure.

What is claimed is:

1. A transmission method for a first node or a second node, comprising obtaining information of a fifth time-frequency resource, and
    performing at least one of the following operations on the fifth time-frequency resource:
        indicating or configuring whether the second node performs transmission on the fifth time-frequency resource, the second node being a next-hop node of the first node;
        indicating that the fifth time-frequency resource is to be used by the first node or the second node for transmission, including indicating that the fifth time-frequency resource is to be used by a Distributed Unit (DU) of the second node for transmission or be used by a Mobile Terminal (MT) of the second node for transmission;
        not expecting the second node to perform the transmission on the fifth time-frequency resource;
        not scheduling the second node to perform the transmission on the fifth time-frequency resource; or
        not configuring the second node to perform the transmission on the fifth time-frequency resource;
        wherein each of a time unit or a time-frequency resource for the second node is configured to be in any of a first state, a second state and a third state;
        wherein in the first state, the DU of the second node is capable or unavailable of performing the transmission;
        in the third state, the DU of the second node is incapable of performing the transmission; and
        in the second state, the DU of the second node is capable of performing the transmission when the MT of the second node does not perform the transmission, wherein the transmission comprises transmitting and/or receiving,
    wherein the indicating or configuring whether the second node performs transmission on the fifth time-frequency resource comprises any of:
        in downlink transmission, indicating, or configuring, or overriding a state of the fifth time-frequency resource in a fourth resource for the second node to be the third state, or to be the second state, or to be not performing transmission; and
        in uplink transmission, indicating, or configuring, or overriding a state of the fifth time-frequency resource in a third resource for the second node to be the third state, or to be the second state, or to be not performing transmission.

2. The transmission method according to claim 1, wherein the obtaining the information of the fifth time-frequency resource comprises at least one of:
    receiving the information of the fifth time-frequency resource reported by the second node;
    receiving high-layer signaling with the information or a configuration of the fifth time-frequency resource;
    receiving a Media Access Control (MAC) Control Element (CE) with the information of the fifth time-frequency resource;
    calculating the information of the fifth time-frequency resource in accordance with at least one of a propagation delay, time for a switching delay or time for a processing delay; or
    configuring the information of the fifth time-frequency resource in accordance with a network parameter.

3. The transmission method according to claim 1, wherein the fifth time-frequency resource comprises any of:
    at least one slot, at least one symbol, an absolute time, a specific time length in units of Ts; or
    the fifth time-frequency resource comprises at least one of:
    first X time-frequency resources of a slot of a Mobile Terminal (MT);
    last X time-frequency resources of the slot of the MT;
    first X time-frequency resources of a slot of a Distributed Unit (DU);
    last X time-frequency resources of the slot of the DU;
    wherein X represents zero or a positive integer.

4. The transmission method according to claim 1, wherein a part of the time units or time-frequency resources for the first node and a part of the time units or time-frequency resources for the second node are configured to be in two of the three states, and the remaining time units or time-frequency resources are configured to be in the remaining one of the three states.

5. The transmission method according to claim 1, wherein
    the time units or time-frequency resources in the first state represent that the time units or time-frequency resources in the second state are indicated to be capable or available of being used for DU transmission;
    the time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

6. The transmission method according to claim 1, wherein the information of the fifth time-frequency resource is obtained in at least one of the following cases:
in downlink transmission, a first resource for the first node is configured to be in the first state or to be used for transmission, a second resource for the first node is configured to be in the third state or not to be used for transmission, and the second resource is located after the first resource;
in the downlink transmission, a third resource for the second node is configured to be in the third state or not to be used for transmission, a fourth resource for the second node is configured to be in the first state or to be used for transmission, and the fourth resource is located after the third resource;
in the downlink transmission, the first resource for the first node is configured to be in the first state or to be used for transmission, the fourth resource for the second node is configured to be in the first state or to be used for transmission, and the fourth resource is located after the first resource;
in uplink transmission, the third resource for the second node is configured to be in the first state or to be used for transmission, the fourth resource for the second node is configured to be in the third state or not to be used for transmission, and the fourth resource is located after the third resource;
in the uplink transmission, the first resource for the first node is configured to be in the third state or not to be used for transmission, the second resource for the first node is configured to be in the first state or to be used for transmission, and the second resource is located after the first resource; or
in the uplink transmission, the third resource for the second node is configured to be in the first state or to be used for transmission, the second resource for the first node is configured to be in the first state or to be used for transmission, and the second resource is located after the third resource.

7. The transmission method according to claim 1,
wherein the indicating that the fifth time-frequency resource is to be used by the second node for transmission comprises:
indicating or configuring the second node to not perform transmission on the fifth time-frequency resource.

8. The transmission method according to claim 1, wherein the not expecting or not scheduling the second node to perform the transmission on the fifth time-frequency resource comprises any of:
in downlink transmission, not scheduling and/or not configuring, by the first node, the second node to perform the transmission on the fifth time-frequency resource in a third resource and/or on the fifth time-frequency resource in a first resource;
in the downlink transmission, not expecting, by the first node, the second node to perform the transmission on the fifth time-frequency resource in a fourth resource;
in uplink transmission, not scheduling and/or not configuring, by the first node, the second node to perform the transmission on the fifth time-frequency resource in the fourth resource and/or on the fifth time-frequency resource in a second resource; and
in the uplink transmission, not expecting, by the first node, the second node to perform the transmission in the fifth time-frequency resource in the third resource.

9. A communication device for a first node or a third node, comprising a memory, a processor, and a computer program stored in the memory and capable of being executed by the processor, wherein the computer program is configured to be executed by the processor to implement the steps of the transmission method according to claim 1.

10. A transmission method for a second node, comprising obtaining information of a fifth time-frequency resource, and performing at least one of the following operations on the fifth time-frequency resource:
receiving a first message from a first node or a third node, the first message indicating or configuring whether the second node performs transmission on the fifth time-frequency resource, the first node being a preceding-hop node of the second node;
receiving a second message from the first node or the third node, the second message indicating that the fifth time-frequency resource is to be used by the first node or the second node for transmission, wherein the transmission comprises transmitting and/or receiving, including indicating that the fifth time-frequency resource is to be used by a Distributed Unit (DU) of the second node for transmission or be used by a Mobile Terminal (MT) of the second node for transmission;
not expecting the second node to perform the transmission on the fifth time-frequency resource;
not scheduling the second node to perform the transmission on the fifth time-frequency resource; or
not configuring the second node to perform the transmission on the fifth time-frequency resource;
wherein each of a time unit or a time-frequency resource for the second node is configured to be in any of a first state, a second state and a third state;
wherein in the first state, the DU of the second node is capable or unavailable of performing the transmission;
in the third state, the DU of the second node is incapable of performing the transmission; and
in the second state, the DU of the second node is capable of performing the transmission when the MT of the second node does not perform the transmission,
wherein the indicating or configuring whether the second node performs transmission on the fifth time-frequency resource comprises any of:
in downlink transmission, indicating, or configuring, or overriding a state of the fifth time-frequency resource in a fourth resource for the second node to be the third state, or to be the second state, or to be not performing transmission; and
in uplink transmission, indicating, or configuring, or overriding a state of the fifth time-frequency resource in a third resource for the second node to be the third state, or to be the second state, or to be not performing transmission.

11. The transmission method according to claim 10, wherein the obtaining the information of the fifth time-frequency resource comprises at least one of:
receiving high-layer signaling, the high-layer signaling with the information or a configuration of the fifth time-frequency resource;

receiving an MAC CE with the information of the fifth time-frequency resource;
calculating the information of the fifth time-frequency resource in accordance with at least one of a propagation delay, time for a switching delay or time for a processing delay; or
configuring the information of the fifth time-frequency resource in accordance with a network parameter.

12. The transmission method according to claim 10, wherein the fifth time-frequency resource comprises any of:
at least one slot, at least one symbol, an absolute time, a specific time length in units of Ts; or
the fifth time-frequency resource comprises at least one of:
first X time-frequency resources of a slot of a MT;
last X time-frequency resources of the slot of the MT;
first X time-frequency resources of a slot of a DU;
last X time-frequency resources of the slot of the DU;
wherein X represents zero or a positive integer.

13. The transmission method according to claim 10, wherein
the time units or time-frequency resources in the first state represent that the time units or time-frequency resources in the second state are indicated to be capable or available of being used for DU transmission;
the time units or time-frequency resources in the third state represent that no indication indicating that the time units or time-frequency resources in the second state are used for the DU transmission has been received, or represent that a part of the time units or time-frequency resources in the second state corresponding to the MT is scheduled and/or configured for at least one of periodic and/or semi-persistent transmission, the transmission of a semi-statically configured channel, the transmission of a reference signal, or the transmission of a specific time-frequency resource.

14. The transmission method according to claim 10, wherein
the first message indicates or configures the second node to not perform transmission on the fifth time-frequency resource.

15. The transmission method according to claim 10, wherein the not expecting and/or not scheduling and/or not configuring the fifth time-frequency resource to perform the transmission comprises at least one of:
in downlink transmission, not expecting the MT of the second node to perform the transmission on the fifth time-frequency resource in a third resource;
in the downlink transmission, not expecting the first node to schedule and/or configure the transmission and/or perform the transmission on the fifth time-frequency resource in a first resource;
in the downlink transmission, not expecting and/or not configuring and/or not scheduling the DU of the second node to perform the transmission on the fifth time-frequency resource in a fourth resource;
in uplink transmission, not scheduling and/or not configuring the DU of the second node to perform the transmission on the fifth time-frequency resource in the third resource;
in the uplink transmission, not expecting the MT of the second node to perform the transmission on the fifth time-frequency resource in the fourth resource; or
in the uplink transmission, not expecting the first node to configure and/or schedule the transmission and/or perform the transmission on the fifth time-frequency resource in a second resource.

16. A non-transitory computer-readable storage medium storing therein a computer program, wherein the computer program is configured to be executed by a processor to implement the steps of the transmission method according to claim 10.

17. A non-transitory computer-readable storage medium storing therein a computer program, wherein the computer program is configured to be executed by a processor to implement that:
a first node or a second node obtains information of a fifth time-frequency resource, and performs at least one of the following operations on the fifth time-frequency resource:
indicating or configuring whether the second node performs transmission on the fifth time-frequency resource, the second node being a next-hop node of the first node;
indicating that the fifth time-frequency resource is to be used by the first node or the second node for transmission, including indicating that the fifth time-frequency resource is to be used by a Distributed Unit (DU) of the second node for transmission or be used by a Mobile Terminal (MT) of the second node for transmission;
not expecting the second node to perform the transmission on the fifth time-frequency resource;
not scheduling the second node to perform the transmission on the fifth time-frequency resource; or
not configuring the second node to perform the transmission on the fifth time-frequency resource;
wherein each of a time unit or a time-frequency resource for the second node is configured to be in any of a first state, a second state and a third state;
wherein in the first state, the DU of the second node is capable or unavailable of performing the transmission;
in the third state, the DU of the second node is incapable of performing the transmission; and
in the second state, the DU of the second node is capable of performing the transmission when the MT of the second node does not perform the transmission, wherein the transmission comprises transmitting and/or receiving,
wherein the indicating or configuring whether the second node performs transmission on the fifth time-frequency resource comprises any of:
in downlink transmission, indicating, or configuring, or overriding a state of the fifth time-frequency resource in a fourth resource for the second node to be the third state, or to be the second state, or to be not performing transmission; and
in uplink transmission, indicating, or configuring, or overriding a state of the fifth time-frequency resource in a third resource for the second node to be the third state, or to be the second state, or to be not performing transmission; or
the computer program is configured to be executed by the processor to implement that:
the second node obtains information of a fifth time-frequency resource, and performs at least one of the following operations on the fifth time-frequency resource:
receiving a first message from the first node or a third node, the first message indicating or configuring whether the second node performs transmission on the fifth time-frequency resource, the first node being a preceding-hop node of the second node;

receiving a second message from the first node or the third node, the second message indicating that the fifth time-frequency resource is to be used by the first node or the second node for transmission, including indicating that the fifth time-frequency resource is to be used by a Distributed Unit (DU) of the second node for transmission or be used by a Mobile Terminal (MT) of the second node for transmission;

not expecting the second node to perform the transmission on the fifth time-frequency resource;

not scheduling the second node to perform the transmission on the fifth time-frequency resource; or not configuring the second node to perform the transmission on the fifth time-frequency resource;

wherein each of a time unit or a time-frequency resource for the second node is configured to be in any of a first state, a second state and a third state;

wherein in the first state, the DU of the second node is capable or unavailable of performing the transmission;

in the third state, the DU of the second node is incapable of performing the transmission; and in the second state, the DU of the second node is capable of performing the transmission when the MT of the second node does not perform the transmission, wherein the indicating or configuring whether the second node performs transmission on the fifth time-frequency resource comprises any of:

in downlink transmission, indicating, or configuring, or overriding a state of the fifth time-frequency resource in a fourth resource for the second node to be the third state, or to be the second state, or to be not performing transmission; and in uplink transmission, indicating, or configuring, or overriding a state of the fifth time-frequency resource in a third resource for the second node to be the third state, or to be the second state, or to be not performing transmission.

* * * * *